US012627873B2

(12) United States Patent
Nakamura et al.

(10) Patent No.: US 12,627,873 B2
(45) Date of Patent: May 12, 2026

(54) IMAGE PICKUP APPARATUS HAVING COOLING STRUCTURE

(71) Applicant: CANON KABUSHIKI KAISHA, Tokyo (JP)

(72) Inventors: Yuta Nakamura, Kanagawa (JP); Yuko Teruya, Kanagawa (JP); Hayato Mano, Tokyo (JP); Yoshinobu Shibayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 18/610,180

(22) Filed: Mar. 19, 2024

(65) Prior Publication Data

US 2024/0323501 A1 Sep. 26, 2024

(30) Foreign Application Priority Data

Mar. 23, 2023 (JP) ................................ 2023-046754

(51) Int. Cl.
*H04N 23/52* (2023.01)

(52) U.S. Cl.
CPC .................................. *H04N 23/52* (2023.01)

(58) Field of Classification Search
CPC ...................................................... H04N 23/52
See application file for complete search history.

(56) References Cited

U.S. PATENT DOCUMENTS

| | | | | |
|---|---|---|---|---|
| 10,721,379 | B2 * | 7/2020 | Yamamoto | G02B 7/02 |
| 12,216,385 | B2 * | 2/2025 | Mano | G03B 3/10 |
| 12,464,209 | B2 * | 11/2025 | Endo | H04N 23/531 |
| 2018/0278814 | A1 * | 9/2018 | Yamamoto | H04N 23/55 |
| 2021/0055512 | A1 * | 2/2021 | Yamamoto | H04N 23/52 |
| 2021/0055631 | A1 * | 2/2021 | Mano | H05K 7/20418 |
| 2021/0232024 | A1 * | 7/2021 | Endo | H04N 23/54 |
| 2023/0164408 | A1 * | 5/2023 | Endo | H05K 7/20154 348/333.06 |
| 2025/0123540 | A1 * | 4/2025 | Mano | G03B 17/56 |

FOREIGN PATENT DOCUMENTS

JP 2022077037 A 5/2022

* cited by examiner

*Primary Examiner* — Antoinette T Spinks
(74) *Attorney, Agent, or Firm* — Cowan, Liebowitz & Latman, P.C.

(57) ABSTRACT

An image pickup apparatus capable of efficiently cooling a recording medium stored therein while suppressing an increase in size of the image pickup apparatus. The image pickup apparatus comprising an image pickup apparatus main body, a grip part disposed in the image pickup apparatus main body and to be gripped when the image pickup apparatus is used, a control board provided to the image pickup apparatus main body and arranged substantially perpendicular to an optical axis direction, a storage part that is mounted on the control board in a position not overlapping the grip part as viewed in the optical axis direction, and that is capable of storing a recording medium, and a heat dissipation duct that is disposed in a position not overlapping the grip part as viewed in the optical axis direction and is thermally connected to the storage part.

25 Claims, 27 Drawing Sheets

IMAGE PICKUP APPARATUS HAVING COOLING STRUCTURE

BACKGROUND OF THE INVENTION

Field of the Invention

The present invention relates to an image pickup apparatus having a cooling structure.

Description of the Related Art

In an image pickup apparatus, a signal processing load and power consumption increase together with an increase in resolution and a high frame rate of a recorded video, and a heat generation amount of a signal processor such as an image pickup part and a recording medium increases.

Because the performance of the electronic components in the image pickup apparatus decreases at high temperatures, it is necessary to provide a cooling structure inside the image pickup apparatus. Japanese Laid-Open Patent Publication (kokai) No. 2022-77037 discloses a heat dissipation structure for forcibly air-cooling the interior of an image pickup apparatus. The image pickup apparatus disclosed in Japanese Laid-Open Patent Publication (kokai) No. 2022-77037 incorporates a forced air-cooling flow path, performs exchanges heat by causing the outside air supplied from an intake port on a back surface of the apparatus to pass through the forced air-cooling flow path, and then exhausts the air from an exhaust port on a side surface of the apparatus to cool a main heat source inside the apparatus.

However, Japanese Laid-Open Patent Publication (kokai) No. 2022-77037 does not take into account cooling of a recording medium. If a structure for cooling a recording medium is newly added, the apparatus increases in size. In the future, with an increase in the writing bit rate due to high image quality, a further increase in the amount of heat generation in the recording medium is predicted, and it is therefore necessary to efficiently cool the recording medium.

SUMMARY OF THE INVENTION

The present invention provides an image pickup apparatus capable of efficiently cooling a recording medium stored therein while suppressing an increase in size of the image pickup apparatus.

Accordingly, the present invention provides an image pickup apparatus comprising an image pickup apparatus main body, a grip part disposed in the image pickup apparatus main body and to be gripped when the image pickup apparatus is used, a control board provided to the image pickup apparatus main body and arranged substantially perpendicular to an optical axis direction, a storage part that is mounted on the control board in a position not overlapping the grip part as viewed in the optical axis direction, and that is capable of storing a recording medium, and a heat dissipation duct that is disposed in a position not overlapping the grip part as viewed in the optical axis direction and is thermally connected to the storage part.

According to the present invention, it is possible to efficiently cool a recording medium stored in an image pickup apparatus while suppressing an increase in size of the image pickup apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
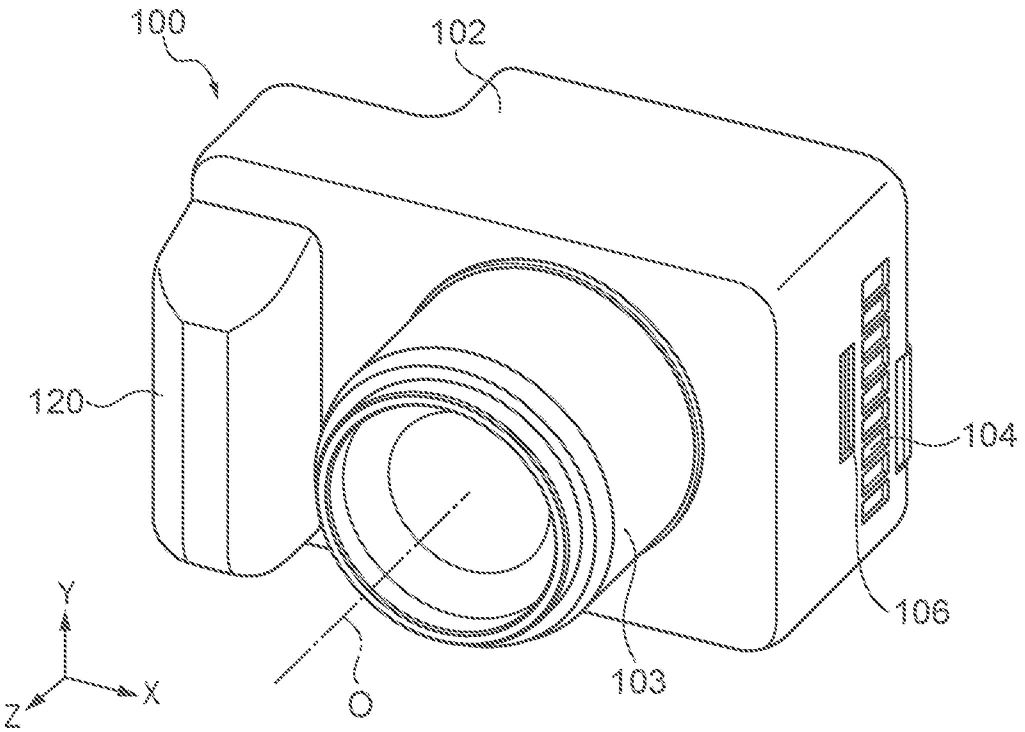
FIGS. 1A and 1B are a front perspective view and a rear perspective view of an image pickup apparatus, respectively.
Figure 1B:
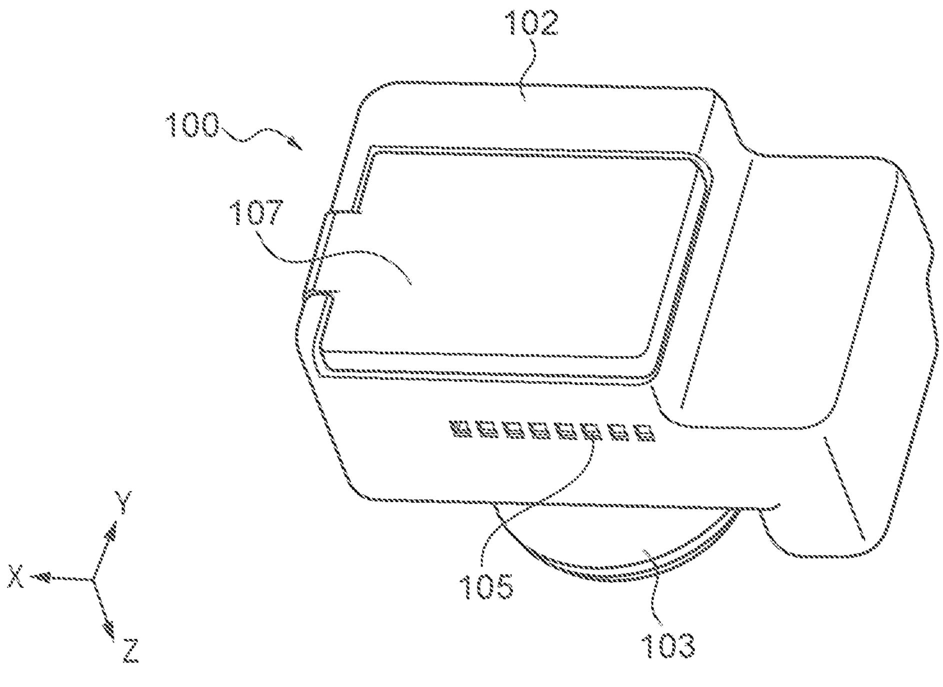

FIGS. 1A and 1B are perspective views of an image pickup apparatus 100 according to a first embodiment of the present invention. For ease of description, an XYZ coordinate system is defined as follows. A shooting optical axis direction (an optical axis O direction) of the image pickup apparatus 100 is defined as the Z axis, wherein the subject side is defined as positive (+Z). A width direction (left-right direction) of the image pickup apparatus 100 on a plane orthogonal to the Z axis is defined as the X axis, wherein a right side as viewed from the subject side (the +Z side) when the image pickup apparatus 100 is in a horizontal position is defined as positive (+X). In the following description, "right (side)" represents the +X (side), and "left (side)" represents an −X (side). A vertical direction of the image pickup apparatus 100 is defined as a Y axis, wherein a direction toward the top when the image pickup apparatus 100 is in a horizontal position is positive (+Y). Therefore, FIG. 1A is a front perspective view of the image pickup apparatus 100, and FIG. 1B is a rear perspective view of the image pickup apparatus 100.

The image pickup apparatus 100 includes an image pickup apparatus main body 102 and a lens 103. Inside the image pickup apparatus main body 102, components encompassing the main functions of the image pickup apparatus, such as a control circuit board 110 (FIGS. 2A and 2B), an image pickup device 116 (FIG. 2B), a power supply part, a recording part for recording images, and various operating parts, are arranged. As shown in FIG. 1A, a lens 103 is attached to the image pickup apparatus main body 102 at a part on the subject side (+Z side). The lens 103 can be replaced according to the shooting situation.

As shown in FIG. 1A, an exhaust port 104 and an insertion port 106 are provided on a right side surface (+X side surface) of the image pickup apparatus main body 102. Air which has become a high temperature inside the image pickup apparatus main body 102 is exhausted from the exhaust port 104 by a forced air cooling mechanism with a cooling fan 113 (FIGS. 2A and 2B) to be described below. When a recording medium 401 is mounted on a media slot 118 (FIG. 3) described below, the recording medium 401 is inserted from the insertion port 106.

As shown in FIG. 1B, an intake port 105 is provided on a bottom surface (−Y side surface) of the image pickup apparatus main body 102. That is, the intake port 105 and the exhaust port 104 are provided on different surfaces of the image pickup apparatus main body 102. The insertion port 106 is provided on the right side surface, which is the same surface as the surface on which the exhaust port 104 is disposed, in the image pickup apparatus main body 102 (FIG. 1A).

Figure 2A:
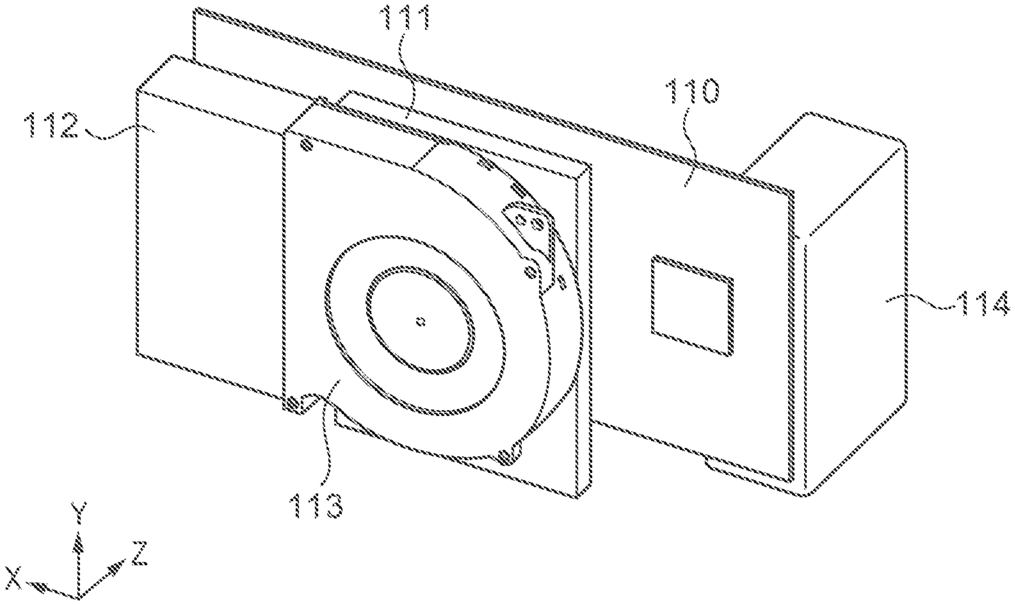
FIGS. 2A and 2B are a rear perspective view and a front perspective view of internal components of the image pickup apparatus, respectively.
Figure 2B:
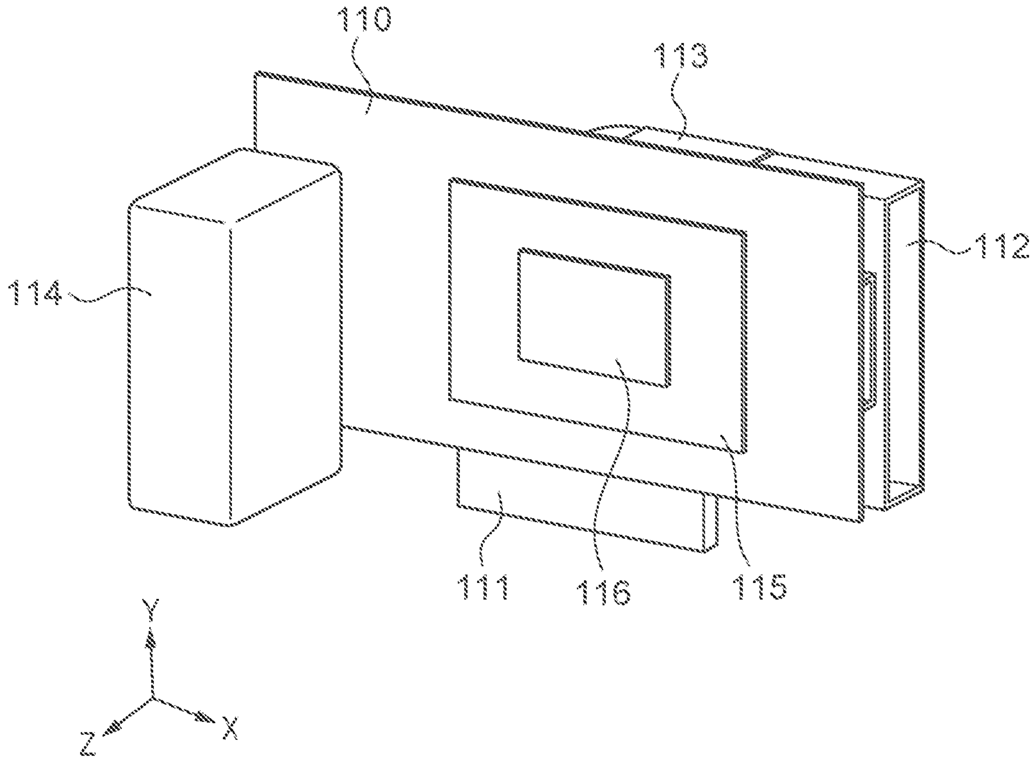

From the intake port 105, cold air is taken into the image pickup apparatus main body 102 by a forced air cooling mechanism with the cooling fan 113 (FIGS. 2A and 2B). A built-in display part 107, which enables a user to check a video that has been shot, is mounted on a back surface (−Z side surface) of the image pickup apparatus main body 102. A grip part 120, with which a photographer (user) grip to hold the image pickup apparatus main body 102 when the image pickup apparatus 100 is used, is arranged on a left-side part of the image pickup apparatus main body 102.

Figure 3:
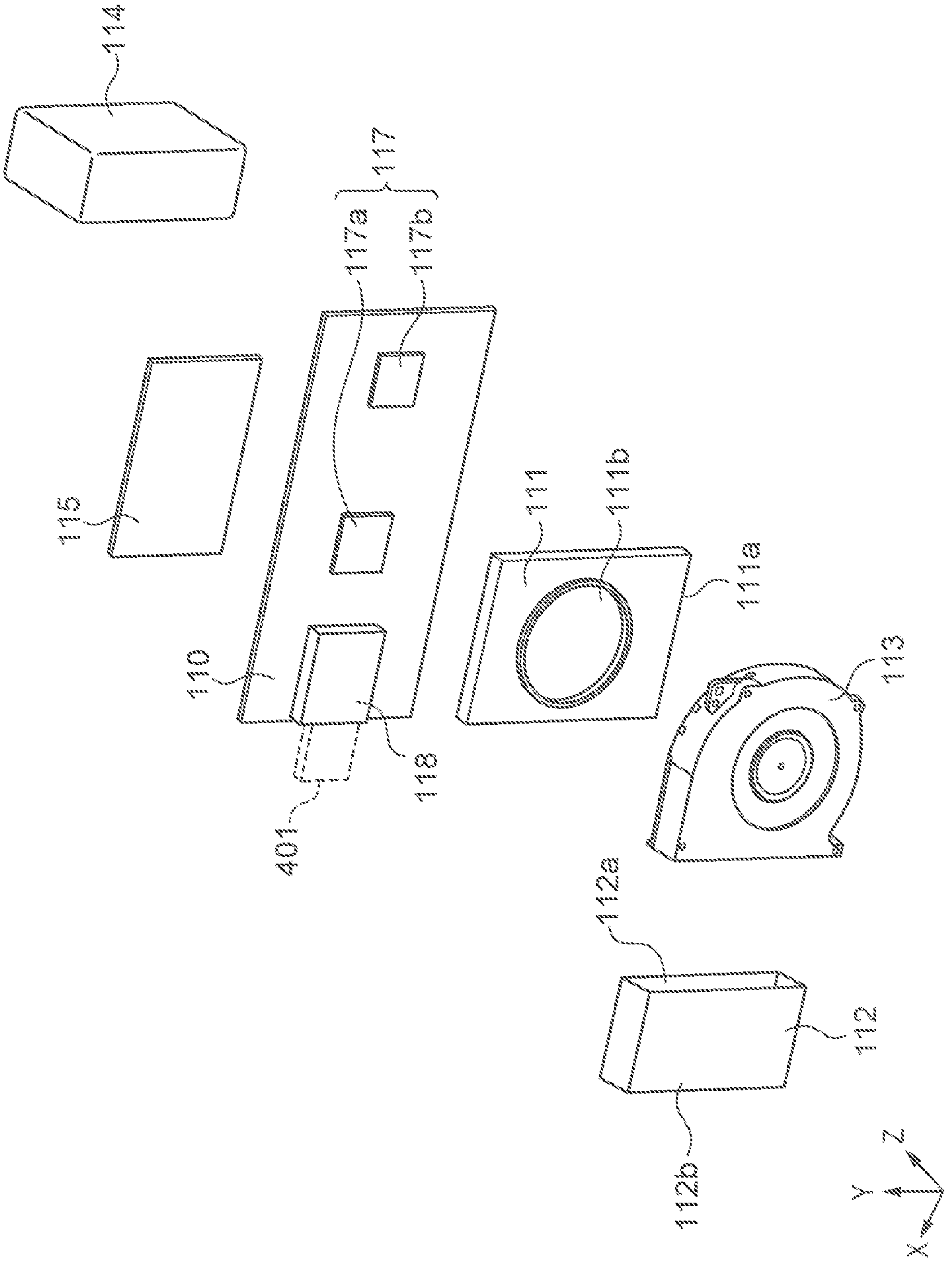
FIG. 3 is a rear exploded perspective view of internal components of the image pickup apparatus.

The internal components of the image pickup apparatus 100 will be described with reference to FIGS. 2A, 2B, and 3. FIG. 2A is a rear perspective view of internal components of the image pickup apparatus 100, and FIG. 2B is a front perspective view of internal components image pickup apparatus 100. FIG. 3 is a rear exploded perspective view of internal components of the image pickup apparatus 100. In FIGS. 2A, 2B, and 3, illustration of components other than the main components is omitted.

As shown in FIGS. 2A, 2B, and 3, the internal components of the image pickup apparatus 100 mainly includes the control circuit board 110, a first duct 111, a second duct 112, the cooling fan 113, the battery 114, an image pickup device board 115, and the image pickup device 116.

The control circuit board 110 is a control board that controls the entire image pickup apparatus 100. Elements 117 (117*a*, 117*b*) and a media slot 118, which are heat sources, are mounted on the control circuit board 110. The media slot 118 is a storage part that stores a recording medium 401, which is an example of a recording medium on which data and the like are recorded, in an insertable and removable manner. The elements 117*a* and 117*b* are an example of a "heat source other than the storage part".

As shown in FIG. 3, the first duct 111 includes a first duct intake part 111*a* and a first duct exhaust part 111*b*. The second duct 112 includes a second duct intake part 112*a* and a second duct exhaust part 112*b*. The first duct 111 is connected to the intake side (+Z side) of the cooling fan 113, and the second duct 112 is connected to the exhaust side (+X side) of the cooling fan 113.

The cooling fan 113 is a so-called centrifugal fan, and is configured to discharge air taken in from a planar direction, in a centrifugal (side surface) direction. The image pickup apparatus 100 takes in air (outside air) from the intake port 105 (FIG. 1B) through the rotation of the cooling fan 113, and dissipates heat by exhausting the air from the exhaust port 104 (FIG. 1A) via the cooling fan 113.

A "heat dissipation duct" for cooling the interior of the image pickup apparatus 100 includes the first duct 111, the second duct 112, and the cooling fan 113.

Figure 4A:
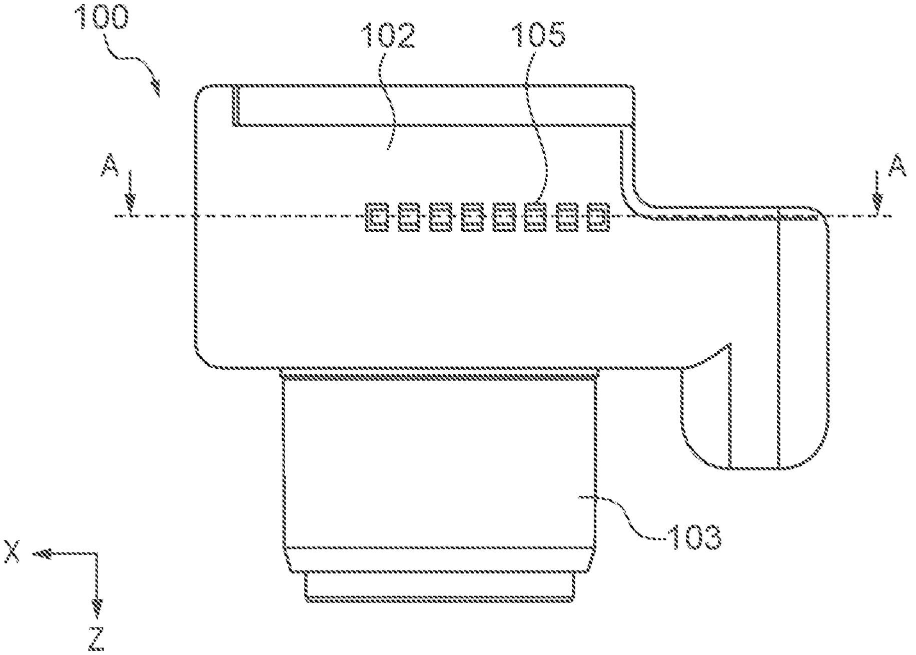
FIGS. 4A and 4B are a bottom view of the image pickup apparatus and a cross-sectional view taken along line A-A, respectively.
Figure 4B:
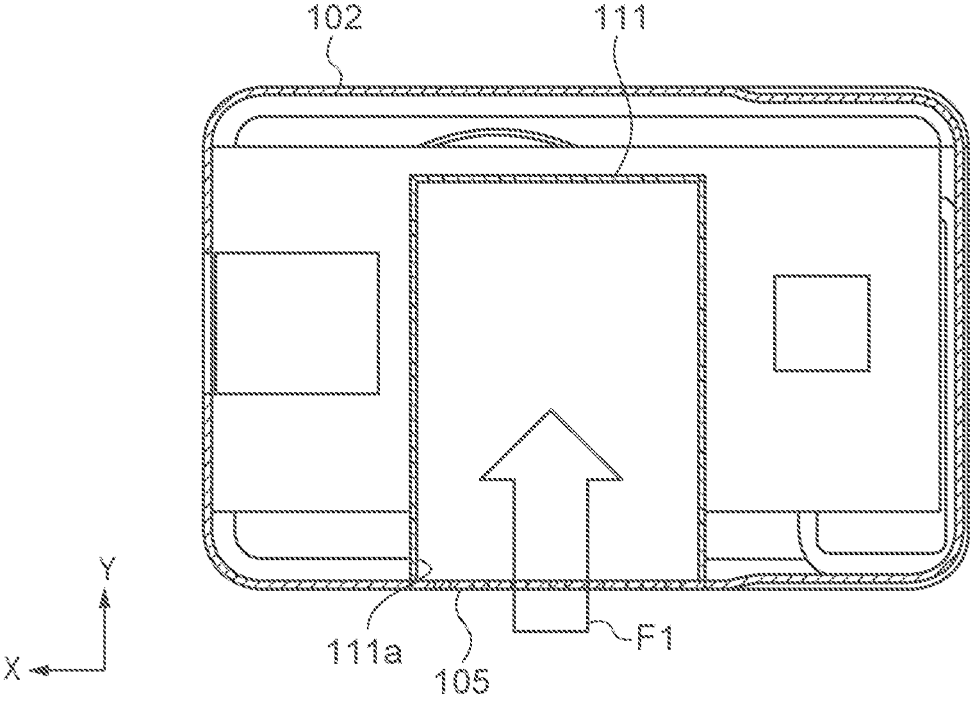
Figure 5A:
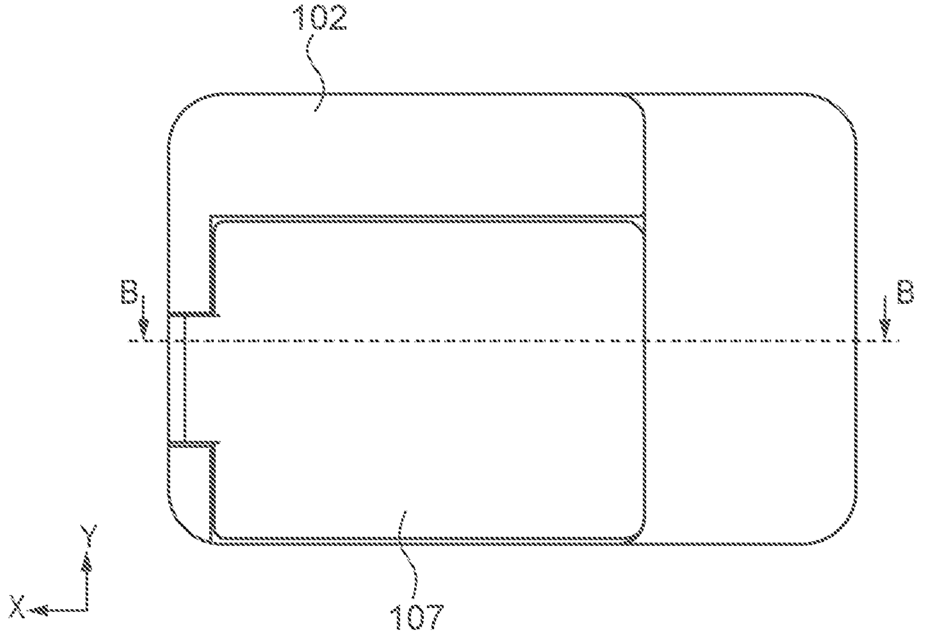
FIGS. 5A and 5B are a rear view of the image pickup apparatus and a cross-sectional view taken along line B-B, respectively.
Figure 5B:
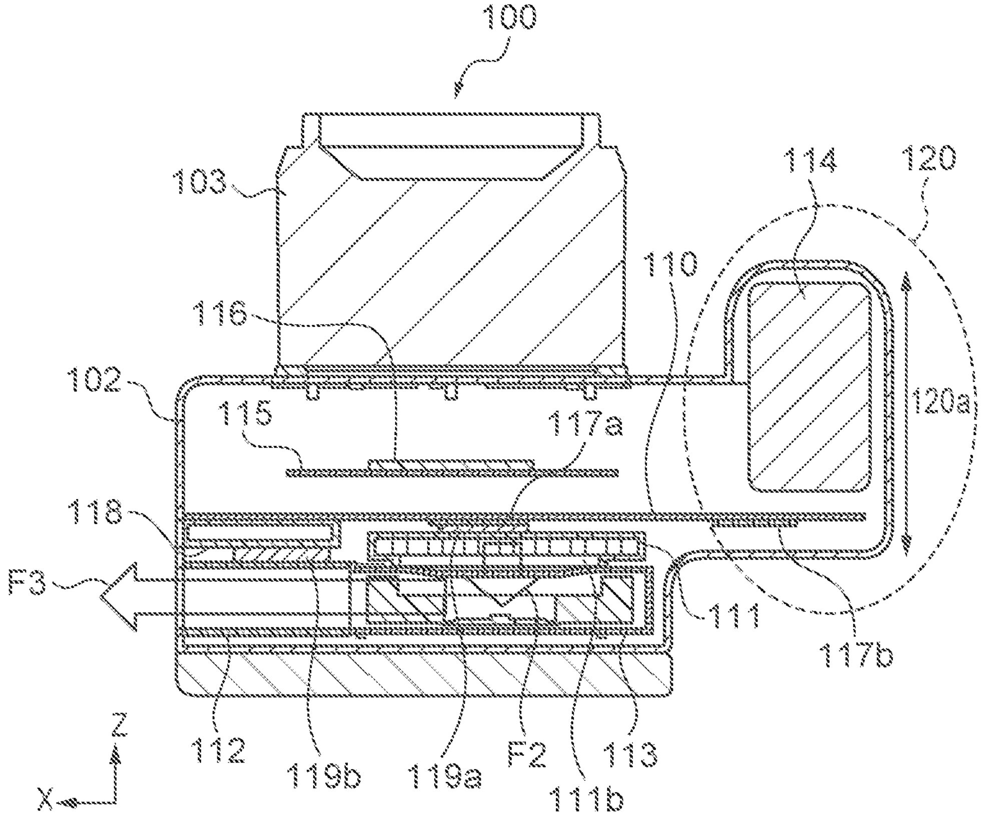

A heat dissipation structure of the image pickup apparatus 100 will be described with reference to FIGS. 4A, 4B, 5A, and 5B. FIG. 4A is a bottom view of the image pickup apparatus 100. FIG. 4B is a cross-sectional view taken along line A-A in FIG. 4A. FIG. 5A is a rear view of the image pickup apparatus 100. FIG. 5B is a cross-sectional view taken along line B-B in FIG. 5A.

As shown in FIG. 5B, the control circuit board 110, the image pickup device board 115, and the image pickup device 116 are each arranged substantially perpendicular to the optical axis direction. Various operation buttons (not illustrated) for performing various setting operations and release operations are provided on the top surface and the back surface of the grip part 120 (FIG. 5B). The battery 114, which supplies power to the image pickup apparatus 100, is disposed inside the grip part 120. A part of the control circuit board 110 on the −X side is located on the back surface side of the battery 114 inside the grip part 120. The length 120*a* of the grip part 120 in the optical axis direction is determined in consideration of the balance between the gripping and the operability.

The first duct 111, the second duct 112 and the cooling fan 113, which constitute the heat dissipation duct, are arranged at positions so as not to overlap the grip part 120 as viewed in the optical axis direction, which suppressing an increase in the length 120*a* of the grip part 120 in the optical axis direction.

A flow path in the image pickup apparatus main body 102 will be described. Each of the first duct 111, the second duct 112, and the cooling fan 113 is arranged substantially parallel to the control circuit board 110, on the back side (−Z side) of the control circuit board 110 (FIG. 5B)). The intake port 105 and the first duct intake part 111*a* are connected (FIG. 4B), and the exhaust port 104 (FIG. 1A) and the second duct exhaust part 112*b* (FIG. 3) are connected.

The outside air is taken in from the intake port 105 and the first duct intake part 111*a* through the rotation of the cooling fan 113, and the air flows in the first duct 111 in the direction of the arrow F1 (+Y direction) (FIG. 4B). Thereafter, as shown in FIG. 5B, the air passes through the interior of the first duct 111 in the direction of arrow F2 (−Z direction), and is then taken in from the first duct exhaust part 111*b* to the cooling fan 113. The air taken in by the cooling fan 113 is introduced into the second duct 112 from the second duct intake part 112*a* (FIG. 3) and flows in the direction of arrow F3 (+X direction) (FIG. 5B). Further, after passing through the second duct 112, the air is exhausted to the outside of the image pickup apparatus main body 102 from the second duct exhaust part 112*b* (FIG. 3) and the exhaust port 104 (FIG. 1A).

The first duct 111 and the second duct 112 are both made of a metal member which is highly heat-conductive. It should be noted that a fin (not illustrated) may be erectly provided in the flow path of each duct in order to enhance the heat exchange with the air. It should be noted that the first duct 111 and the second duct 112 may be integrally formed as a single unit.

The thickness of the second duct 112 in the Z direction is larger than the thickness of the first duct 111 in the Z direction. Therefore, the second duct 112 has a larger flow path cross-sectional surface area (surface area of a cross-section perpendicular to the flow path direction) than the first duct 111. Here, the flow path cross-sectional surface area of the first duct 111 is the area of a cross-section perpendicular to the F1 direction. The flow path cross-sectional surface area of the second duct 112 is the area of a cross-section perpendicular to the F3 direction. As a result, the flow rate in the second duct 112 is smaller than that in the first duct 111, and thus the air exhausted from the exhaust port 104 is weaker. It is thus possible to reduce the discomfort felt by the user when hit by the exhaust air.

As shown in FIG. 5B, at least two elements (electronic components) 117, which are heat sources, are mounted on the control circuit board 110. The power consumption of the element 117*a* is higher than the power consumption of the element 117*b*. The element 117*a* is, for example, an element requiring a large amount of electric power, such as an image processing engine. Among the heat sources other than the recording medium 401, the element 117*a* may be the main heat source on the control circuit board 110.

The element 117*a*, which has a high heat dissipation requirement, is disposed substantially on a projection-part of the control circuit board 110, onto which the first duct 111 is projected onto the control circuit board 110 in the optical axis direction (Z direction). Therefore, the element 117*a* overlaps a part of the first duct 111 when viewed in the optical axis direction. Consequently, the heat of the element 117*a* can be efficiently transferred to the first duct 111 through a heat-conductive member 119*a*. The heat-conductive member 119*a* is made of a heat-dissipating rubber which is highly heat-conductive, for example.

Meanwhile, the element 117*b*, which requires low heat dissipation, is disposed in the grip part 120. The element 117*b* overlaps at least a part of the grip part 120 as viewed in the optical axis direction.

Further, the media slot 118 is arranged at an end portion on the opposite side (+X side) to the grip part 120 on the control circuit board 110 in the left-right direction. That is, the grip part 120 is arranged at the left end portion (one end portion) of the image pickup apparatus main body 102 (shown on the right part in the image pickup apparatus main body 102 in FIG. 5B), and the media slot 118 is arranged at the right end portion (the other end portion) of the image pickup apparatus main body 102 (shown on the left part in the image pickup apparatus main body 102 in FIG. 5B).

The media slot 118 is thermally connected to the second duct 112 disposed on the back side (−Z side) of the media slot 118 via the heat-conductive member 119*b*. As a result, heat generated in the recording medium 401 inserted into the media slot 118 is transferred to the second duct 112 via the media slot 118 and the heat-conductive member 119*b*.

That is, the heat of the element 117*a* having high power consumption on the control circuit board 110 is transferred to the first duct 111, and is dissipated to the outside of the image pickup apparatus main body 102 through the above-described flow path. The heat of the recording medium 401 is transferred to the second duct 112 and dissipated to the outside of the image pickup apparatus main body 102 through the above-described flow path.

According to the present embodiment, the media slot 118 is mounted on the control circuit board 110 at a position not overlapping the grip part 120 as viewed in the optical axis direction. The heat dissipation duct (which includes the first duct 111, second duct 112, and cooling fan 113) is disposed at a position not overlapping the grip part 120 when viewed in the optical axis direction, and the second duct 112 is thermally connected to the media slot 118. Neither the media slot 118 nor the heat dissipation duct overlaps the grip part 120 when viewed in the optical axis direction. This arrangement suppresses an increase in the length 120*a* of the grip part 120 in the optical axis direction. Furthermore, the media slot 118 and the second duct 112 are thermally connected, which makes it possible to efficiently dissipates the heat of the media slot 118 and the recording medium 401. As a result, it is possible to efficiently cool the recording medium (recording medium 401) while suppressing an increase in size.

In addition, the first duct 111 and the second duct 112 are parallel to the control circuit board 110, which contributes to suppression of expansion in the dimensions of the image pickup apparatus 100 in the optical axis direction. In particular, when viewed in the optical axis direction, the media slot 118 does not overlap the first duct 111 and overlaps a part of the second duct 112. Further, when viewed in the left-right direction (X direction), the media slot 118 does not overlap the second duct 112 and overlaps a part of the first duct 111. That is, the media slot 118 is disposed in a space formed by the first duct 111 and the second duct 112 (that is, in the space on the +X side of the first duct 111 and on the +Z side of the second duct 112). As a result, the media slot 118 is arranged by effectively using the space in the image pickup apparatus 100, which contributes to miniaturization of the image pickup apparatus 100.

Furthermore, the element 117*a*, which is a heat source other than the media slot 118 mounted on the control circuit board 110, is thermally connected to the first duct 111, which makes it possible to efficiently cool the element 117*a*.

In addition, the flow path cross-sectional surface area of the second duct 112 is larger than the flow path cross-sectional surface area of the first duct 111, which reduces the discomfort due to the exhaust air from the second duct 112 felt by the user.

A second embodiment of the present invention will be described with reference to FIGS. 6A to 9C. In the image pickup apparatus 300 according to the present embodiment, matters not specifically mentioned are similar to those of the image pickup apparatus 100 according to the first embodiment described above.

Figure 6A:
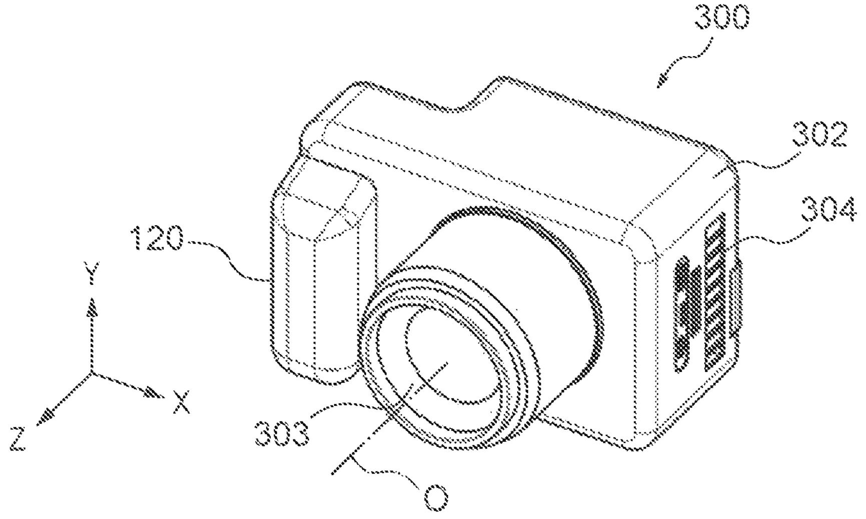
FIGS. 6A to 6C are a front perspective view, a rear perspective view and a right side view of the image pickup apparatus, respectively.
Figure 6B:
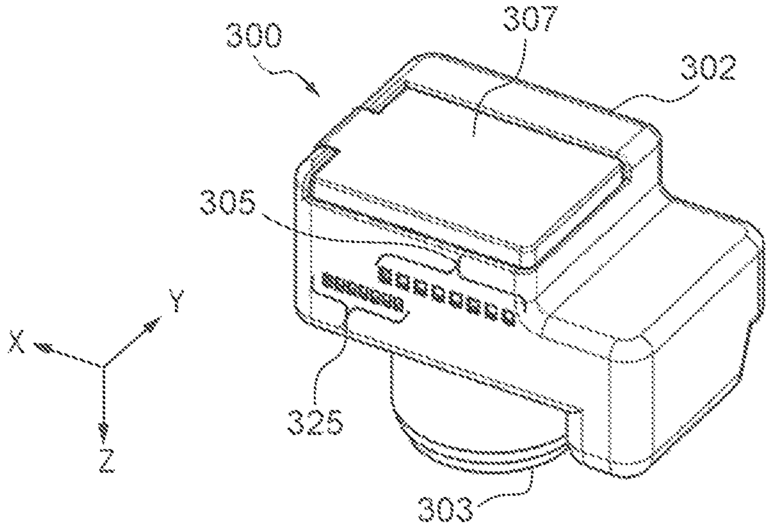
Figure 6C:
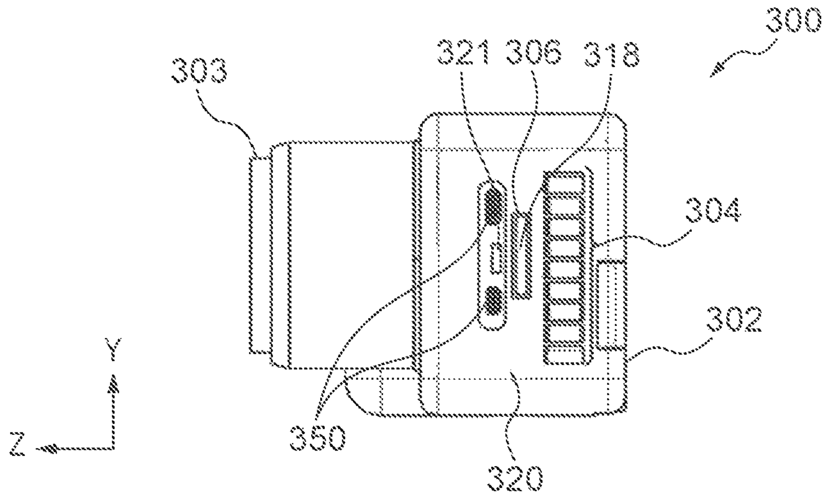
Figure 7:
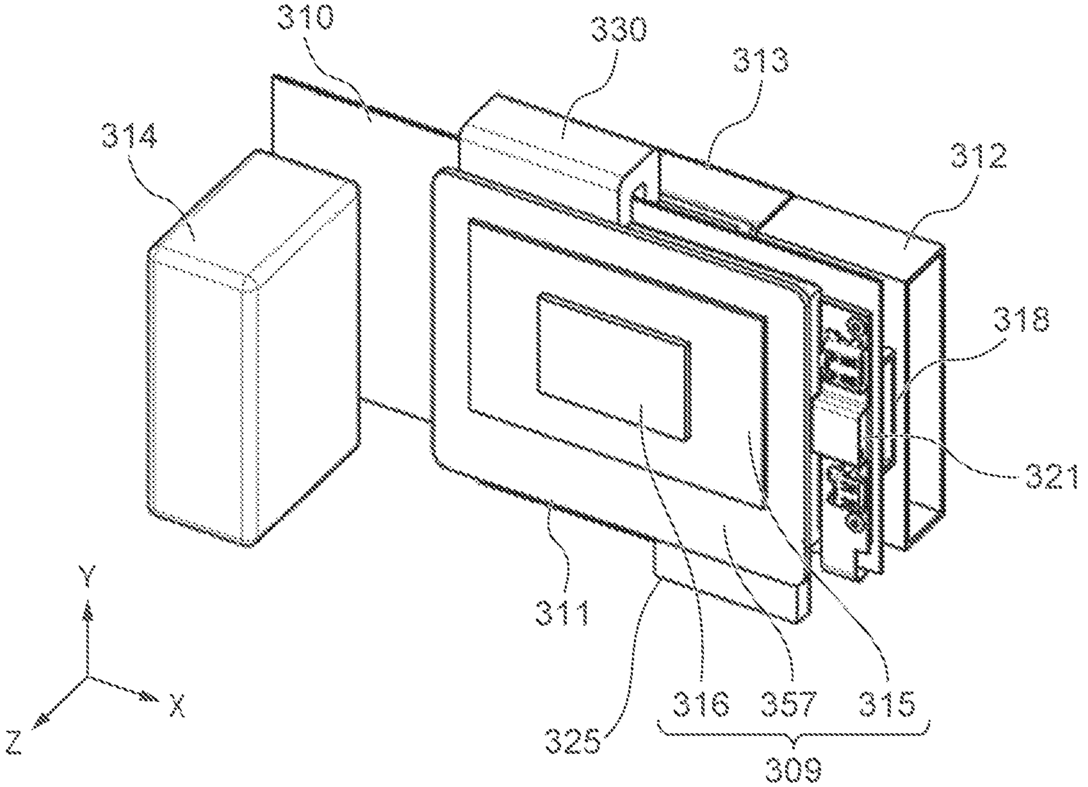
FIG. 7 is a front perspective view of internal components of the image pickup apparatus.

FIG. 6A is a front perspective view of the image pickup apparatus 300; FIG. 6B is a rear perspective view of the image pickup apparatus 300; and FIG. 6C is a right side view of the image pickup apparatus 300. FIG. 7 is a front perspective view of internal components of the image pickup apparatus 300.

As shown in FIG. 6A, the image pickup apparatus 300 includes an image pickup apparatus main body 302 and a lens 303. As shown in FIG. 7, inside the image pickup apparatus main body 302, components encompassing the main functions of the image pickup apparatus, such as a control circuit board 310, an image pickup device 316, a power supply part, a recording part for recording images, and various operating parts, are arranged.

As shown in FIG. 6B, a first intake port 305 and a second intake port 325 are provided on a bottom surface (−Y side surface) of the image pickup apparatus main body 302. Cold outside air is taken into the main body from the first intake port 305 and the second intake port 325 by the forced air cooling mechanism with the cooling fan 313 (FIG. 7). A display part 307 is mounted on a rear surface (−Z side surface) of the image pickup apparatus main body 302, display part 307 enabling a user to check a video that has been shot (or that is being shot).

As shown in FIG. 6C, an exhaust port 304, an insertion port 306, and connection terminals 350 are provided on a right side surface 320 (+X side surface) of the image pickup apparatus main body 302. Two connection terminals 350 are provided side by side in the Y direction. Air which has become a high temperature inside the image pickup apparatus main body 302 is exhausted from the exhaust port 304 by the forced air cooling mechanism with the cooling fan 313. When the recording medium 401 is mounted on the media slot 318 (FIG. 7), the recording medium 401 is inserted from the insertion port 306. The connection terminal 350 is a terminal for communicating with an external device, and a plurality of (for example, two) connection terminals is provided. A third intake port 321 is disposed between the two connection terminals 350 in the Y direction. When viewed from the +X side, the insertion port 306 is located between the exhaust port 304 and the third intake port 321. That is, the media slot 318 is located between the exhaust port 304 and the third intake port 321 in the optical axis direction.

Figure 8A:
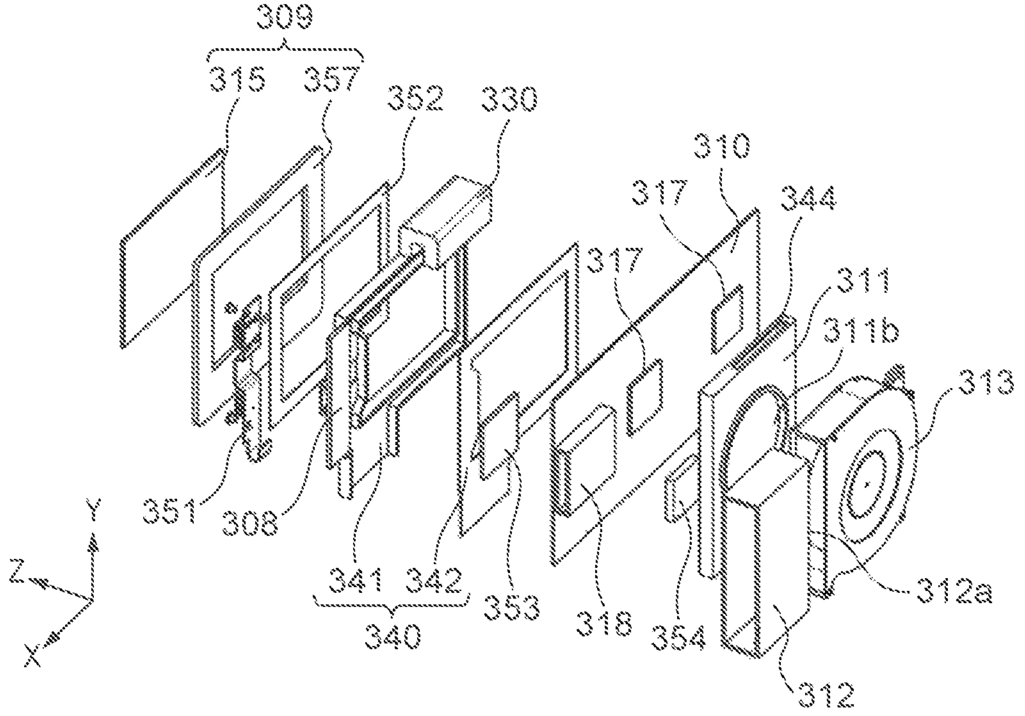
FIGS. 8A and 8B are a rear exploded perspective view and a front exploded perspective view of an internal configuration of the image pickup apparatus, respectively.
Figure 8B:
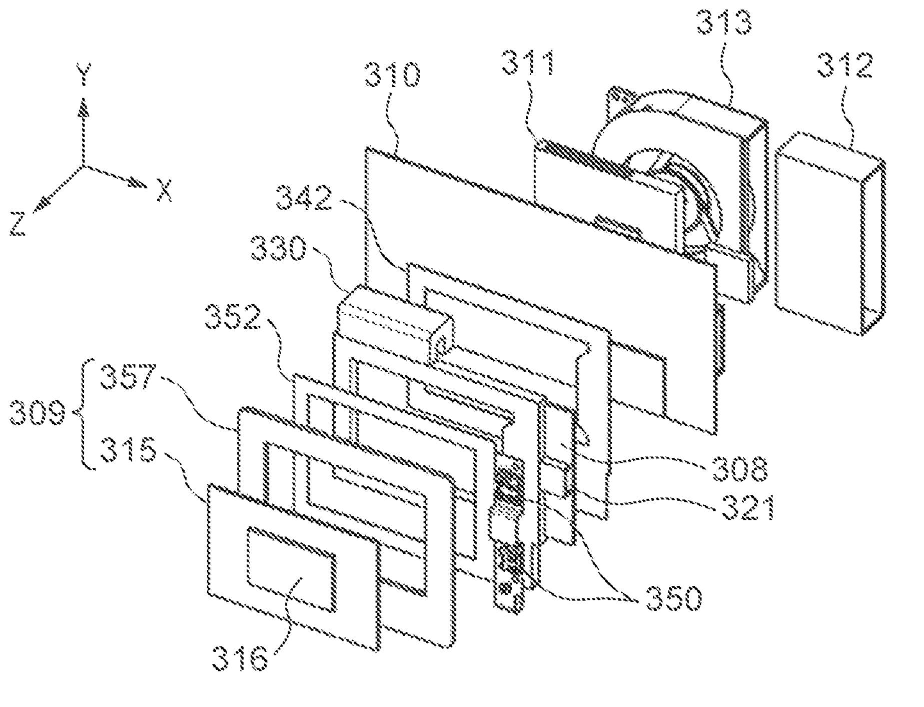

The internal configuration of the image pickup apparatus 300 will be described with reference to FIGS. 7, 8A, and 8B. FIG. 8A is a rear exploded perspective view of the internal configuration of the image pickup apparatus 300, and FIG. 8B is a front exploded perspective view of the internal configuration of the image pickup apparatus 300. In FIGS. 7, 8A, and 8B, illustration of components other than the main components is omitted.

As shown in FIGS. 8A and 8B, inside the image pickup apparatus 300, a control circuit board 310, a first duct 311, a second duct 312, a cooling fan 313, a duct connection part 330, a battery 314 (FIG. 7), and an image pickup part 309 are mainly provided. The image pickup part 309 includes an image pickup device board 315, an image pickup device 316, and holding metal plate 357 (FIG. 7).

The image pickup device 316 is mounted on the image pickup device board 315 substantially in parallel to the image pickup device board 315, wherein the image pickup device board 315 is fixed to the holding metal plate 357 by an adhesive or the like. The control circuit board 310 is a control board that controls the entire image pickup apparatus 300. Elements 317 and a media slot 318, which are heat sources, are mounted on the control circuit board 310.

The first duct 311 includes a first duct exhaust part 311*b* and a connecting intake part 344. The second duct 312 includes a second duct intake part 312*a*. The first duct 311 is connected to the cooling fan 313 via the first duct exhaust part 311*b*. The second duct 312 is connected to the cooling fan 313 via the second duct intake part 312*a*. The image pickup apparatus 300 takes in air (outside air) from the first intake port 305 (FIG. 6B) through the rotation of the cooling fan 313, and dissipates heat by exhausting the air from the exhaust port 304 (FIGS. 6A and 6C) via the cooling fan 313.

As shown in FIG. 8A, the second duct 312 is disposed on the back side (−Z side) of the media slot 318 which is a heat source. The media slot 318 and the second duct 312 are thermally connected via a first elastic member 354 which is heat-conductive. As a result, heat generated in the recording medium 401 inserted into the media slot 318 is transferred to the second duct 312 via the media slot 318 and the first elastic member 354.

A third duct 340 is disposed between the image pickup part 309 and the control circuit board 310 in the optical axis direction. That is, the third duct 340 is disposed on the side (+Z side) opposite to the side on which the media slot 318 is mounted with respect to the control circuit board 310 in the optical axis direction. The third duct 340 comprises a third duct body 341 and a third duct lid member 342, wherein a cooperation of the third duct body 341 and the third duct lid member 342 forms a flow path in the third duct 340. The third duct body 341 is thermally connected to the holding metal plate 357 via a second elastic member 352 which is heat-conductive. The third duct lid member 342 is thermally connected to the control circuit board 310 via a third elastic member 353 which is heat-conductive.

The region of the third duct 340 to which the third elastic member 353 is connected, the region of the third elastic member 353, and the area in the control circuit board 310 within which the media slot 318 is mounted, at least partially overlap each other when viewed in the optical axis direction. That is, the media slot 318 and the third duct 340 at least partially overlap each other when viewed in the optical axis direction. The control circuit board 310 and the third duct 340 are thermally connected to each other within an area where the media slot 318 and the third duct 340 overlap each other when viewed in the optical axis direction.

With the above configuration, the heat of the image pickup part 309 and the heat of the media slot 318 are transferred to the third duct 340, and the image pickup part 309 and the media slot 318 are cooled by the wind (air, outside air) passing through the third duct 340.

The third duct body 341 has an extension 308. The extension 308 is a portion formed so as to extend in the +X direction from the third duct body 341, and is part of the third duct body 341 that does not form a flow path. The flexible cable 351 on which the connection terminal 350 is mounted is fixed to the extension 308. The flexible cable 351 is electrically connected to the control circuit board 310.

The heat dissipation structure of the image pickup apparatus 300 and the flow of air will now be described. The "heat dissipation duct" for cooling the interior of the image pickup apparatus 300 includes the first duct 311, the second duct 312, and the cooling fan 313.

Figure 9A:
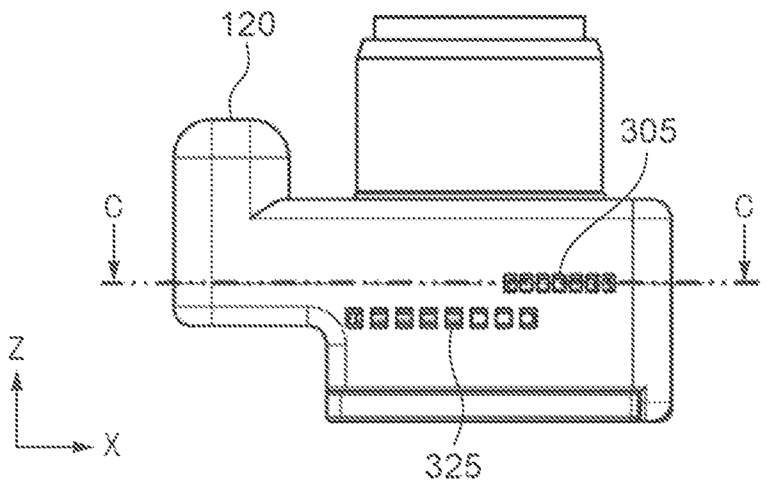
FIGS. 9A to 9C are a bottom view of the image pickup apparatus, a cross-sectional view taken along line C-C, and a schematic top view of the image pickup apparatus, respectively.
Figure 9B:
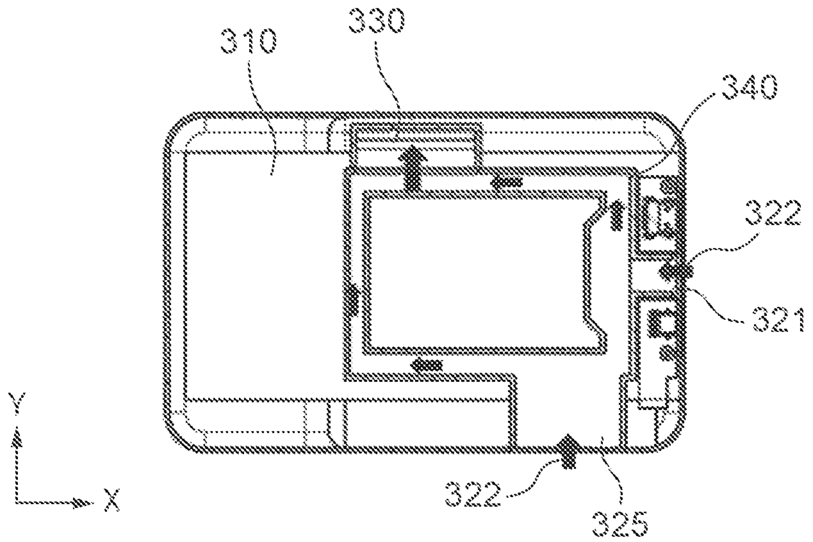
Figure 9C:
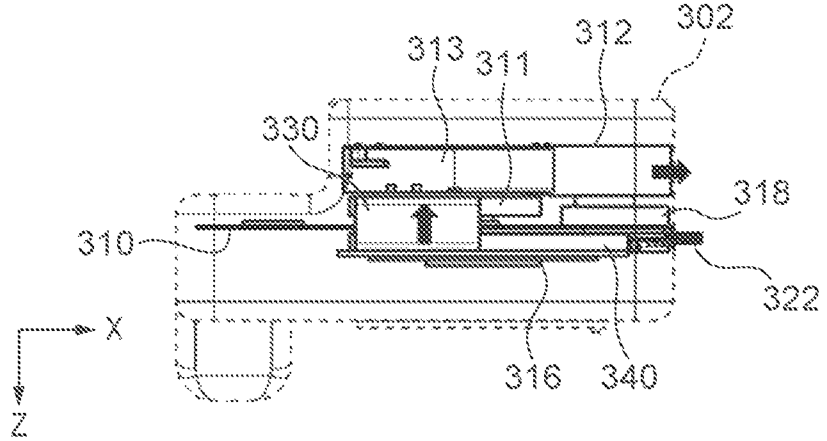

FIG. 9A is a bottom view of the image pickup apparatus 300. FIG. 9B is a cross-sectional view taken along line C-C in FIG. 9A. FIG. 9C is a schematic top view of the image pickup apparatus 300. In FIG. 9C, the exterior is indicated by broken lines to illustrate the internal structure.

It should be noted that, the flow of air by the first duct 311 and the second duct 312 is similar to the flow of air by the first duct 111 and the second duct 112 according to the first embodiment, and therefore a description thereof will be omitted. The flow of outside air pertaining to air cooling of the media slot 318 by the third duct 340 will mainly be described.

As shown in FIGS. 9B and 9C, outside air 322 is supplied to the third duct 340 from the third intake port 321 (FIG. 6C) on the right side surface 320 of the image pickup apparatus main body 302 and the second intake port 325 (FIG. 6B) on the bottom surface of the image pickup apparatus main body 302. The third duct 340 is connected to a connecting intake part 344 (FIG. 8A) of the first duct 311 via a duct connection part 330 extending across the upper side (+Y side) of the control circuit board 310.

The outside air 322 supplied from the third intake port 321 and the second intake port 325 cools the image pickup part 309 and the media slot 318 when passing through the third duct 340 by means of the airflow generated by the cooling fan 313. The air, having cooled the image pickup part 309 and the media slot 318, passes through the duct connection part 330, merges with the air flowing through the first duct 311, and is then discharged from the exhaust port 304 (FIGS. 6A and 6C). As a result, the duct connection part 330 provides a connecting passage for merging the air taken into the third duct 340 into the flow path in the first duct 311.

According to the present embodiment, the media slot 318 is mounted on the control circuit board 310 at a position not overlapping the grip part 120 as viewed in the optical axis direction. The heat dissipation duct (which includes the first duct 311, second duct 312, and cooling fan 313) is disposed at a position not overlapping the grip part 120 when viewed in the optical axis direction, and the second duct 312 is thermally connected to the media slot 118. Therefore, it is possible to achieve advantageous effects similar to those of the first embodiment regarding efficient cooling of the recording medium 401 while suppressing an increase in size.

The media slot 318 and the third duct 340 at least partially overlap each other when viewed in the optical axis direction. Further, the control circuit board 310 and the third duct 340 are thermally connected to each other in an area where the media slot 318 and the third duct 340 overlap each other when viewed in the optical axis direction. Therefore, the heat of the recording medium 401 is efficiently transferred to the third duct 340 through the third elastic member 353. Furthermore, the heat of the recording medium 401 is transferred to the second duct 312 through the first elastic member 354. Thus, heat can be dissipated in both orientations in the optical axis direction from the recording medium 401 by the third duct 340 and the second duct 312, and hence the recording medium 401 can be cooled more efficiently.

Furthermore, the third duct 340 is located between the control circuit board 310 and the image pickup device 316 in the optical axis direction, and is thermally connected to the image pickup device 316. As a result, the third duct 340 has both the cooling function for the portion from the control circuit board 310 to the image pickup device 316 and the cooling function for the recording medium 401, and therefore enables efficient heat dissipation without increasing the number of components. This structure also contributes to suppression of an increase in size.

In addition, the connection terminal 350 for connecting an external device is fixed to the extension 308, which is part of the third duct 340 not forming a flow path, which avoids a temperature rise of the connection terminal 350.

A third embodiment of the present invention will be described with reference to FIGS. 10 to 16. In the image pickup apparatus 100 according to the present embodiment, matters not specifically mentioned are similar to those of the image pickup apparatus 100 according to the first embodiment described above. For example, the flow of air in the first duct 111 is similar to that of the first embodiment.

Figure 10:
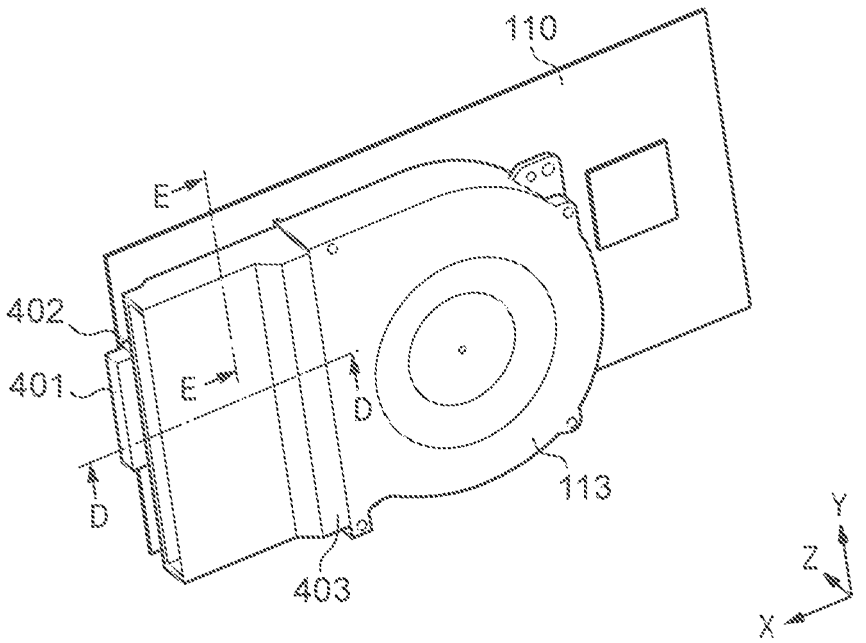
FIG. 10 is a rear perspective view of a cooling structure for a recording medium.

FIG. 10 is a rear perspective view of a cooling structure for a recording medium 401. The recording medium 401, which is a heat source, is inserted into a media slot 402 mounted on the control circuit board 110. The heat generated in the recording medium 401 is transferred to a second duct 403 through the media slot 402. Similarly to the first embodiment, the airflow generated by the cooling fan 113 flows into the second duct 403. As a result, the heat transferred from the recording medium 401 to the second duct 403 can be discharged to the outside of the image pickup apparatus 100.

Figure 11A:
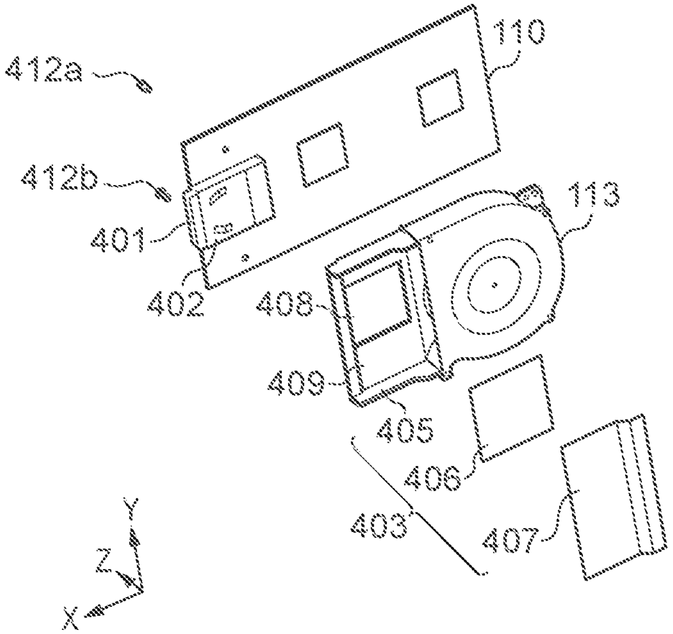
FIGS. 11A and 11B are a rear exploded perspective view and a front exploded perspective view of a cooling structure for a recording medium, respectively.
Figure 11B:
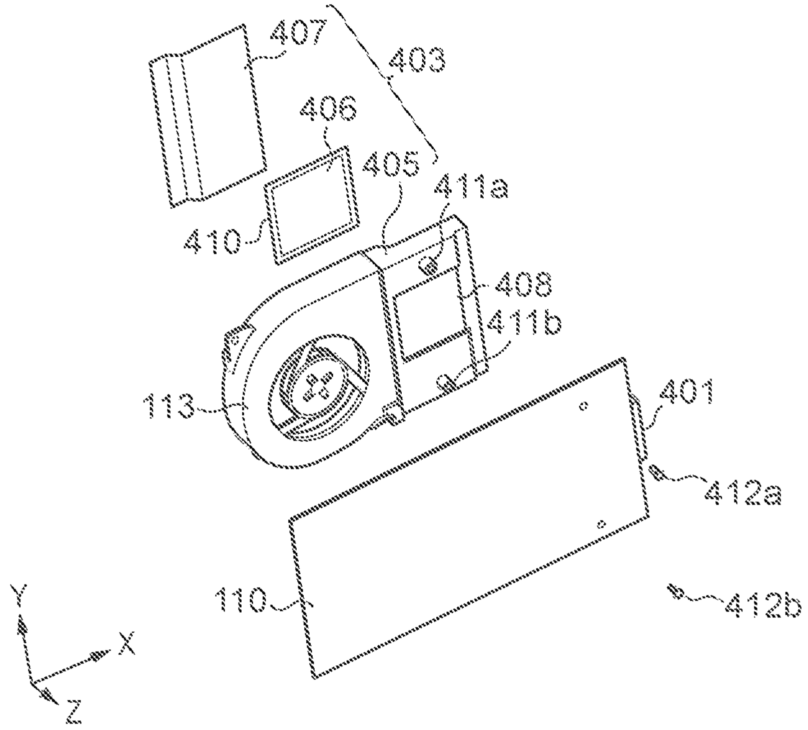

FIG. 11A is a rear exploded perspective view of the cooling structure for the recording medium 401, and FIG. 11B is a front exploded perspective view of the cooling structure for the recording medium 401. The second duct 403 includes a duct base member 405, a film member 406, and a duct case member 407. The duct base member 405 is made of plastic or by metal die casting. The duct base member 405 has a frame opening 408 at a portion where the recording medium 401 is projected onto the duct base member 405 in the optical axis direction. Further, the periphery of the frame opening 408 on the −Z side surface of the duct base member 405 is a pasting surface 409.

The film member 406 is formed of a thin and highly flexible film material made of polyethylene, polypropylene, polyvinyl chloride, or the like. It should be noted that the film member 406 may be made of a material obtained by laminating fibrous raw materials, or a laminated graphite sheet. The film member 406 has an adhesive layer 410 consisting of a double-sided tape, an adhesive material, or the like. When the adhesive layer 410 is stuck to the pasting surface 409, the frame opening 408 is sealed by the film member 406.

Next, an assembly procedure of the cooling structure will be described. First, the operator uses the screws 412*a* and 412*b* to attach the control circuit board 110 to a fastening part 411*a* and a fastening part 411*b* of the duct base member 405. Next, the operator sticks the adhesive layer 410 of the film member 406 to the pasting surface 409 of the duct base member 405. At this time, the film member 406 and the media slot 402 are in contact with each other. A detailed positional relationship between the film member 406 and the media slot 402 will be described below. Next, the operator covers the duct base member 405 with the duct case member 407. As a result, a sealed flow path is formed in the second duct 403. The duct case member 407 and the duct base member 405 constitute a frame part of the second duct 403.

Figure 12:
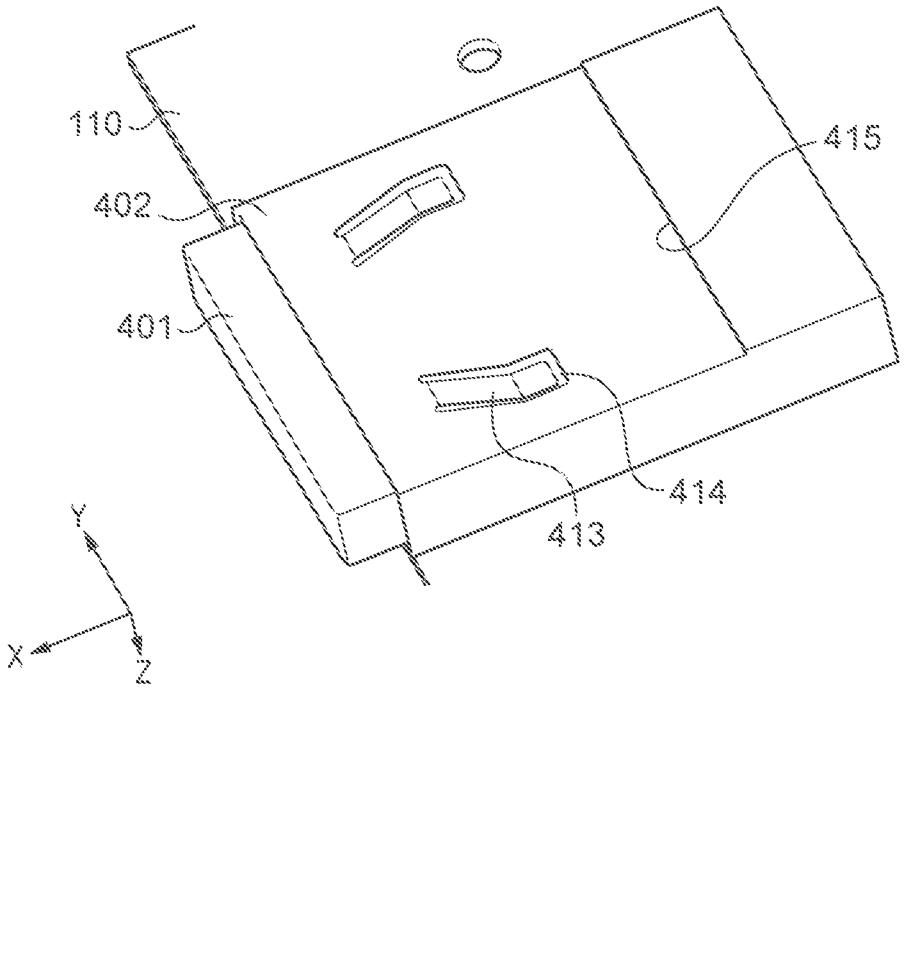
FIG. 12 is a perspective view showing a media slot and a recording medium.

FIG. 12 is a perspective view showing a media slot 402 and a recording medium 401. A detailed shape of the media slot 402 will be described. In the present embodiment, the media slot 402 has an arm part 413 for static elimination and removing rattling of the recording medium 401, on the side (−Z side) facing the second duct 403. The arm part 413 is formed so as to bent toward the +Z direction and abuts on the inserted recording medium 401. In addition, a storage part opening 414 is provided around the arm part 413. That is, the media slot 402 has two arm parts 413 cut and raised inward in the storage part opening 414, and these arm parts

413 abut on the recording medium 401 stored in the media slot 402. The media slot 402 has a step part 415 on the side (−Z side) facing the second duct 403 in the optical axis direction.

Next, a method for connecting the media slot 402 and the film member 406 to each other will be described with reference to FIGS. 13 to 15.

Figure 13:
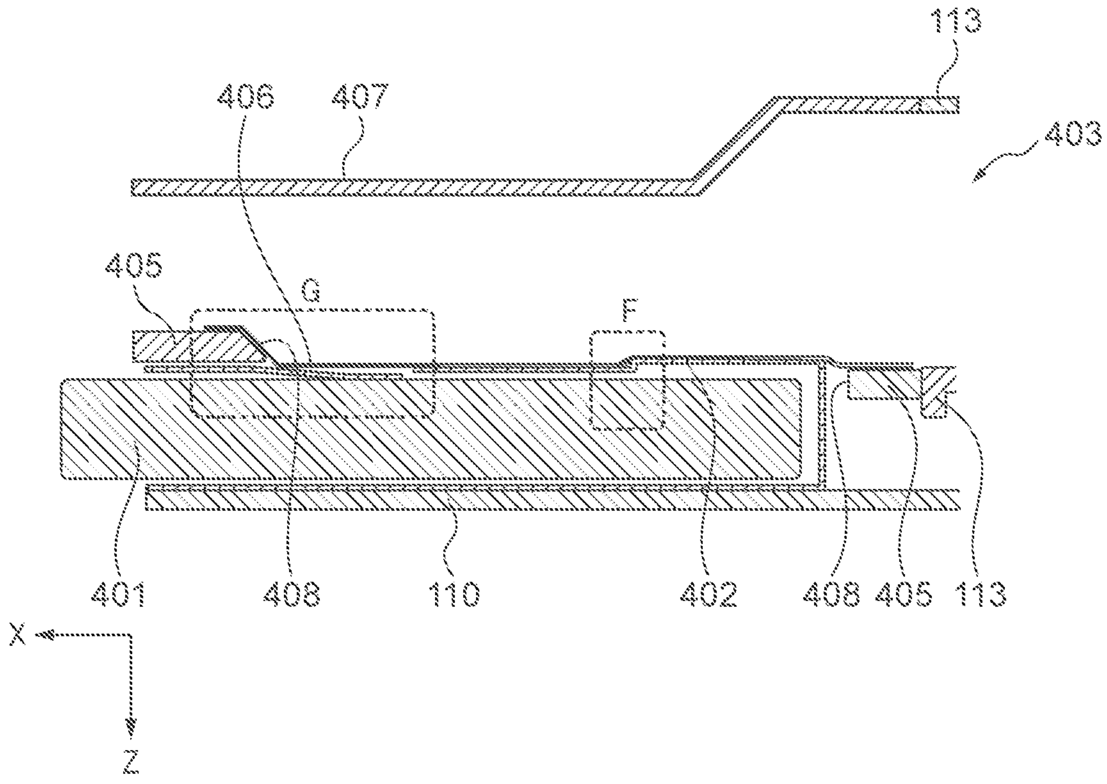
FIG. 13 is a cross-sectional view taken along line D-D in FIG. 10.

FIG. 13 is a cross-sectional view taken along line D-D in FIG. 10. FIG. 14 is an enlarged view of the part F in FIG. 13. FIG. 15 is an enlarged view of the part G in FIG. 13.

The frame part (comprising the duct case member 407 and duct base member 405) and the film member 406 constitute the second duct 403. The film member 406 is a heat transfer part having higher flexibility than the frame part.

In the film member 406, a portion exposed to the inside of the duct from the frame opening 408 (FIG. 11A) of the duct base member 405 is in contact with the media slot 402 over substantially the entire region. The film member 406 is thin and highly flexible, and therefore the heat of the recording medium 401 can be transferred into the second duct 403 without applying an excessive load to the media slot 402 and the recording medium 401.

Figure 14:
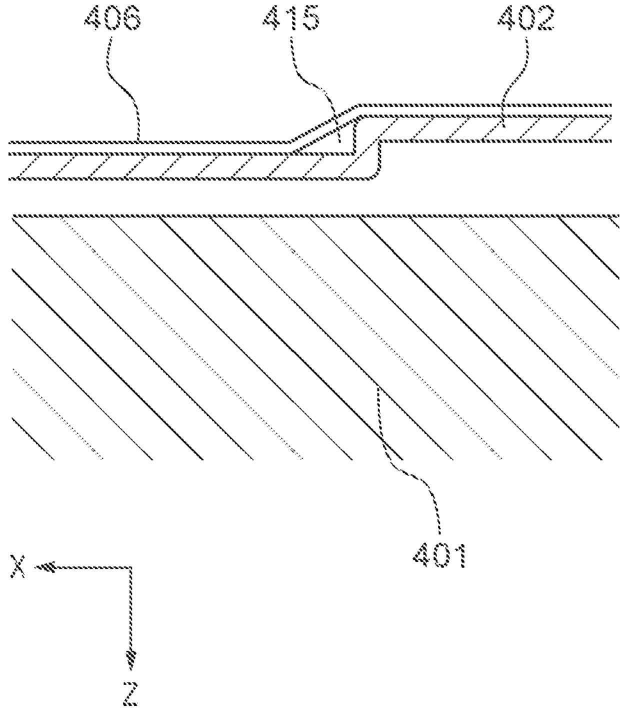
FIG. 14 is an enlarged view of a part F in FIG. 13.

As shown in FIG. 14, the media slot 402 has a step part 415, and the film member 406 covers the step part 415. The flexibility of the film member 406 is high and the cooling fan 113 makes the inside of the second duct 403 a positive pressure, and hence the film member 406 and the media slot 402 can be in contact with each other on the left side and the right side of the step part 415. As the contact surface area between the film member 406 and the media slot 402 increases, the heat dissipation efficiency of the recording medium 401 increases.

Figure 15:
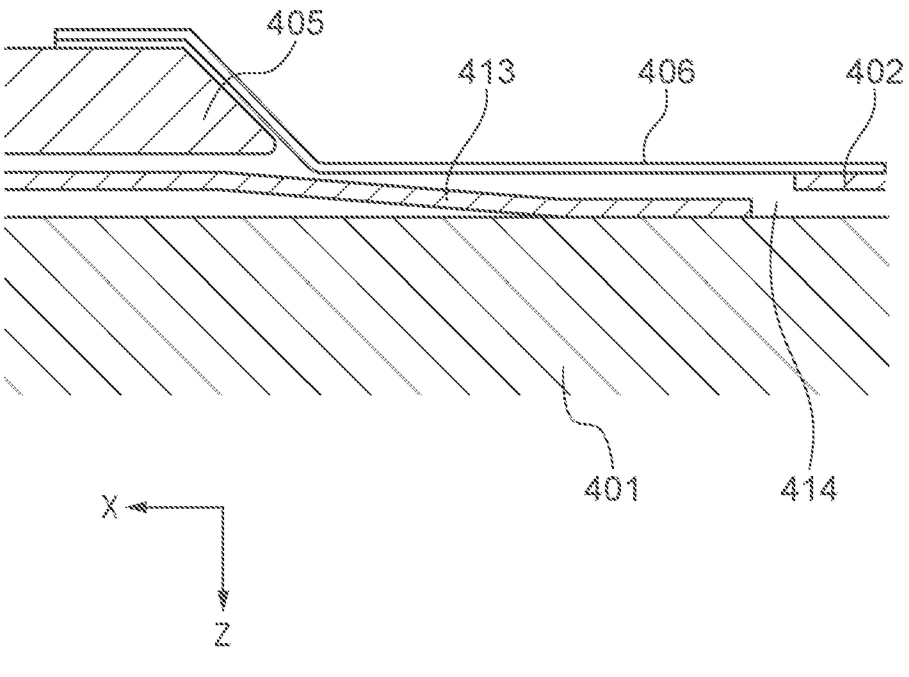
FIG. 15 is an enlarged view of a part G in FIG. 13.

As shown in FIG. 15, the distal end portion of the arm part 413 is in contact with the recording medium 401. By the storage part opening 414 of the media slot 402 being sealed with the film member 406, the airtightness of the flow path of the second duct 403 is secured.

Figure 16:
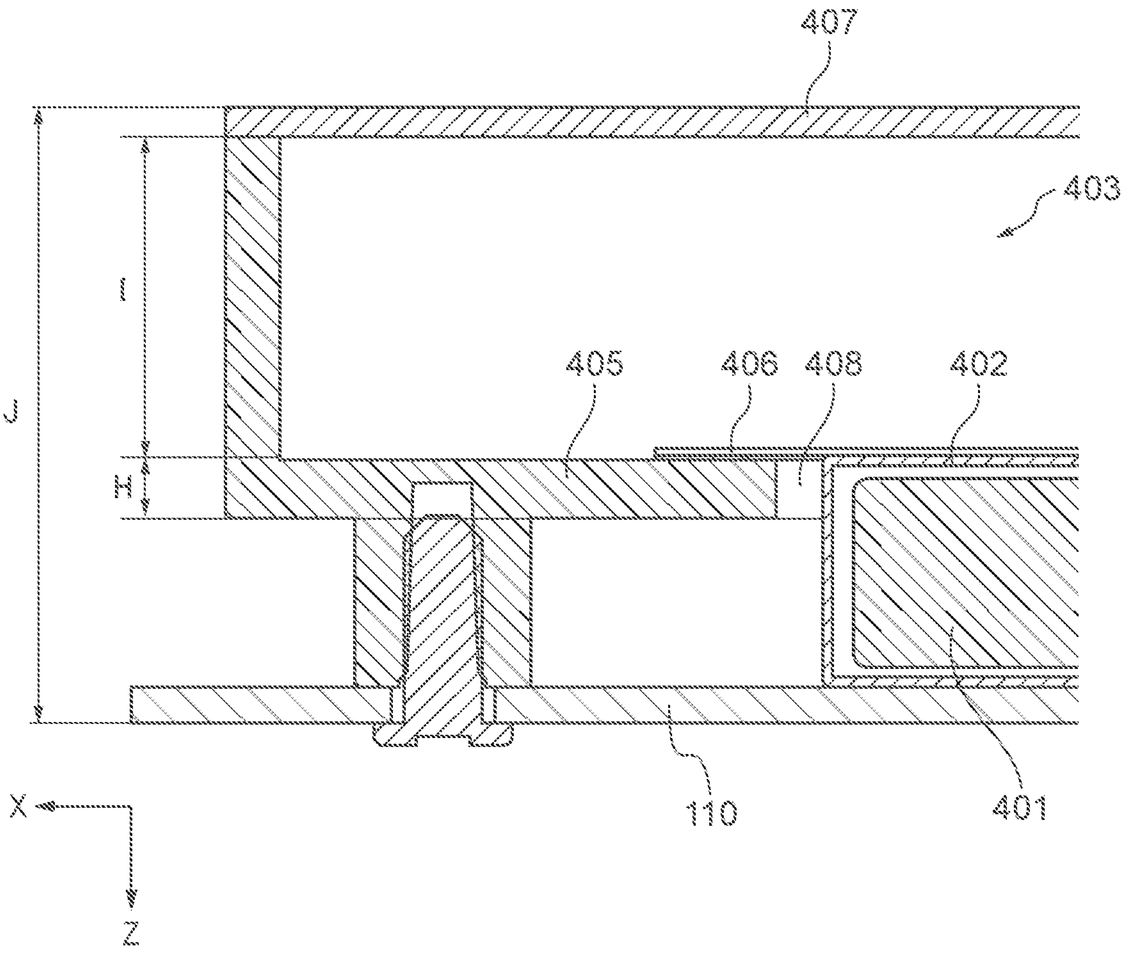
FIG. 16 is a cross-sectional view taken along line E-E in FIG. 10.

Next, the positional relationships in the Z direction between the control circuit board 110, the media slot 402, and the second duct 403 will be described with reference to FIG. 16. FIG. 16 is a cross-sectional view taken along line E-E in FIG. 10.

As shown in FIG. 16, in the Z direction, a part of the upper end of the media slot 402 is within the frame opening 408 of the duct base member 405. In other words, a part of the media slot 402 enters the frame opening 408 in the optical axis direction. The media slot 402 is disposed so as to enter the frame opening 408 by the thickness H of the duct base member 405, which reduces the thickness J of the second duct 403 from the control circuit board 110 without reducing a flow path width I.

In the present embodiment, the adhesion between the film member 406 and the media slot 402 is secured by the positive pressure and the adhesive force generated by the cooling fan 113. However, instead of or in addition to adhesion, a bonding member may be provided between the film member 406 and the media slot 402 to secure adhesion.

According to the present embodiment, the media slot 402 is mounted on the control circuit board 110 at a position not overlapping the grip part 120 as viewed in the optical axis direction. The heat dissipation duct (comprising the first duct 111, second duct 403, and cooling fan 113) is disposed at a position not overlapping the grip part 120 when viewed in the optical axis direction, and the second duct 403 is thermally connected to the media slot 402. Therefore, it is possible to achieve advantageous effects similar to those of the first embodiment regarding efficient cooling of the recording medium 401 while suppressing an increase in size.

The second duct 403 includes a frame part (comprising the duct case member 407 and the duct base member 405) and a film member 406, and the film member 406 is thermally connected to the media slot 402. As a result, the heat of the media slot 402 is dissipated using not only the first duct 111 but also the second duct 403, and hence the cooling effect of the recording medium 401 can be enhanced. In addition, because the film member 406 has higher flexibility than the frame part, the thermal connection between the second duct 403 and the recording medium 401 becomes strong, and the cooling effect can be further enhanced.

The film member 406 is formed in a sheet shape, and is disposed so as to close the frame opening 408 formed in the frame part from the inside of the frame part. The storage part opening 414 provided in the media slot 402 is also covered by the film member 406. Further, the film member 406 is fixed to the inner surface of the frame part by adhesion and/or bonding, and further the inside of the second duct 403 has a positive pressure, and thus adhesion between the film member 406 and the second duct 403 is high even if the step part 415 is present. With such arrangement, it is possible to suppress a reduction in cooling efficiency.

In addition, in the media slot 402, the two arm parts 413 cut and raised inside the media slot 402 in the storage part opening 414 abut on the recording medium 401, which makes it possible to strengthen the holding of the recording medium 401 and the thermal connection between the media slot 402 and the recording medium 401.

In addition, a part of the media slot 402 enters the frame opening 408 in the optical axis direction, which makes it possible to suppress an increase in the dimensions in the optical axis direction.

A fourth embodiment of the present invention and a variation thereof will be described with reference to FIGS. 17A to 24B. In an image pickup apparatus 700 according to the present embodiment, matters not specifically mentioned are similar to those of the image pickup apparatus 100 according to the first embodiment described above.

Figure 17A:
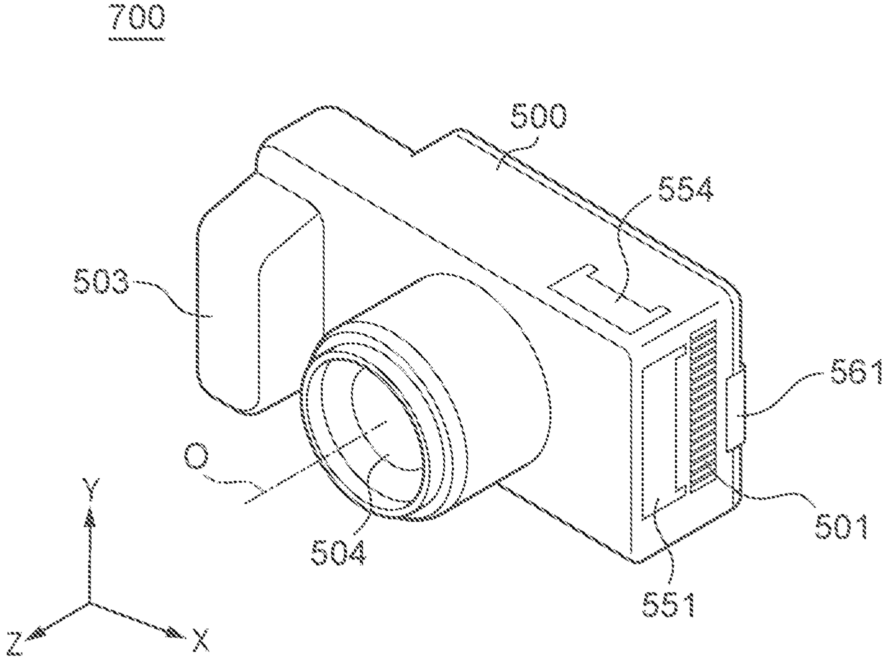
FIGS. 17A and 17B are a front perspective view and a rear perspective view of an image pickup apparatus, respectively.
Figure 17B:
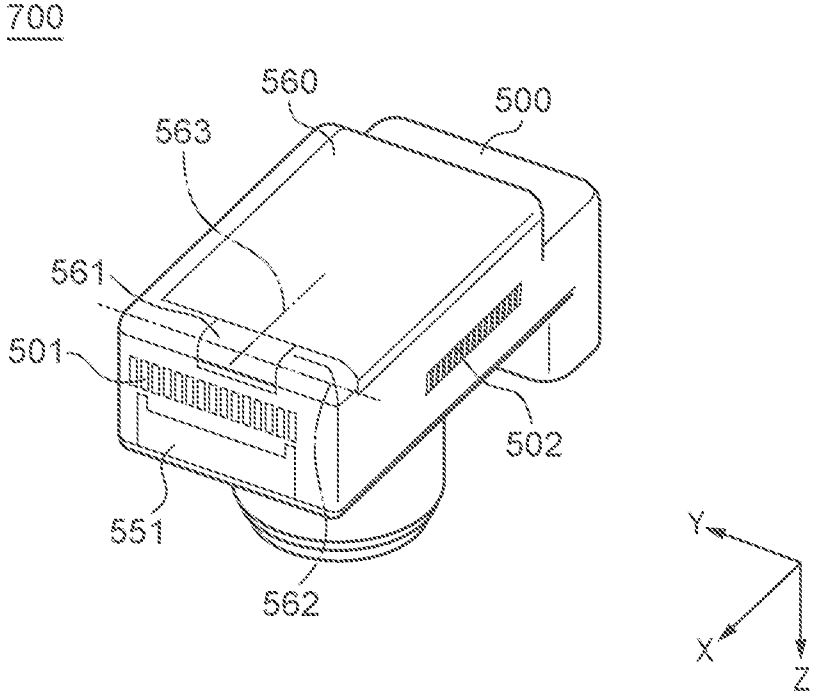

FIG. 17A is a front perspective view of the image pickup apparatus 700, and FIG. 17B is a rear perspective view of the image pickup apparatus 700. The image pickup apparatus 700 includes an image pickup apparatus main body 500 and a lens 504. The image pickup apparatus main body 500 is provided with a media cover 551 and a terminal cover 554.

Figure 18A:
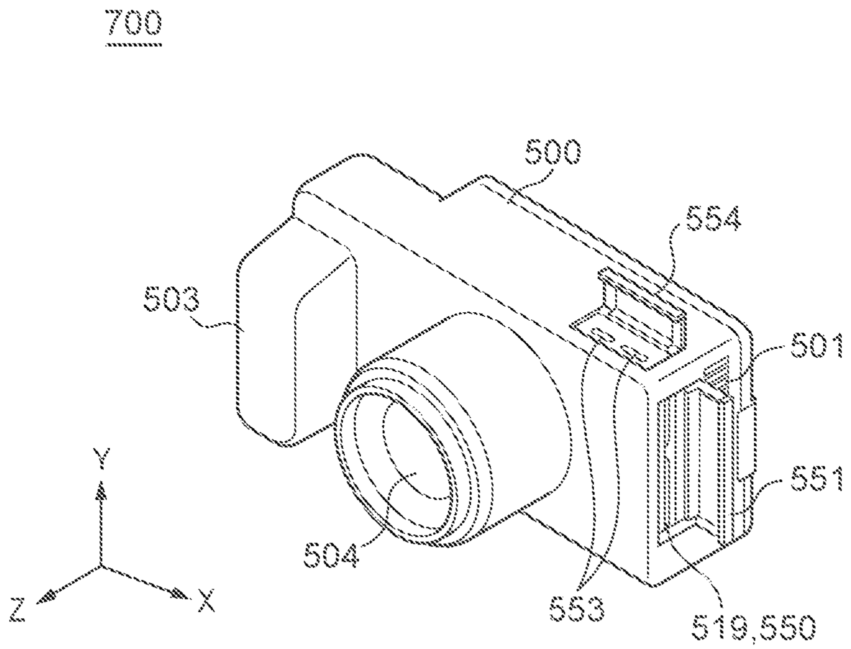
FIGS. 18A and 18B are front perspective views of the image pickup apparatus.
Figure 18B:
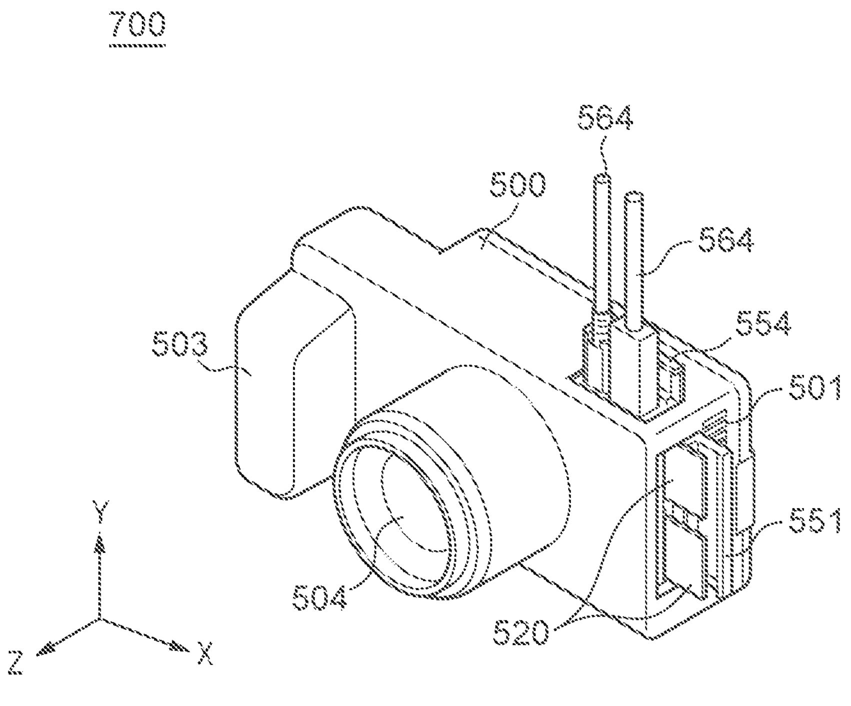

FIGS. 18A and 18B are front perspective views of the image pickup apparatus 700. Each of FIGS. 18A and 18B shows a state in which the media cover 551 and the terminal cover 554 are open.

The image pickup apparatus main body 500 includes a grip part 503, an exhaust port 501, an intake port 502, and a media slot 519. The exhaust port 501 is arranged at an end portion on the +X side of the image pickup apparatus main body 500. The intake port 502 is disposed at the bottom of the image pickup apparatus main body 500. The media slot 519 is arranged at the end portion on the +X side of the image pickup apparatus main body 500. The media slot 519 includes a media insertion part 550, which is a media insertion part for inserting the recording medium 520. The media insertion part 550 is arranged on the +Z side of the exhaust port 501 at the end portion on the +X side of the image pickup apparatus main body 500 (FIG. 18A). Therefore, the exhaust port 501 and the media insertion part 550 are disposed at the end portion on the opposite side (+X side)

to the side, on which the grip part 503 is disposed, in the left-right direction (X direction) of the image pickup apparatus main body 500.

The media cover 551 covers the media insertion part 550. The media cover 551 is opened and closed by being rotated about a media cover rotating shaft 552 (FIG. 21) with respect to the image pickup apparatus main body 500. By opening and closing the media cover 551, the media insertion part 550 is shifted to an exposed state and a covered state, respectively.

The image pickup apparatus main body 500 is provided with a detection switch (not illustrated) that detects a closed state of the media cover 551. When it is detected that the media cover 551 is closed after the recording medium 520 is mounted in the media slot 519, the recording medium 520 can be accessed from a control circuit board 517.

The terminal cover 554 is disposed on the upper surface of the image pickup apparatus main body 500. The terminal cover 554 is opened and closed by being rotated about a terminal cover rotating shaft 555 (FIG. 21) with respect to the image pickup apparatus main body 500. By opening and closing the terminal cover 554, a connection terminal 553 is shifted to an exposed state and to a covered state, respectively. A connection plug 564 can be attached to the connection terminal 553 in a state where the terminal cover 554 is open. FIG. 18B shows a state in which the connection plug 564 is mounted and the recording medium 520 protrudes from the media slot 519.

The display part 560 (FIG. 17B) displays captured images and image pickup information. As shown in FIGS. 17A and 17B, a shaft support portion 561 is disposed at an end portion (the end portion on the +X side) of the image pickup apparatus main body 500 on the side opposite to the side, on which the grip part 503 is disposed, in the X direction. The shaft support portion 561 supports the display part 560 rotatably in two directions relatively to the image pickup apparatus main body 500. Specifically, the shaft support portion 561 supports the display part 560 rotatably by a predetermined angle about an axis of rotation 562 parallel to the Y direction. The shaft support portion 561 supports the display part 560 rotatably by a predetermined angle about an axis of rotation 563 parallel to the X direction.

Figure 19A:
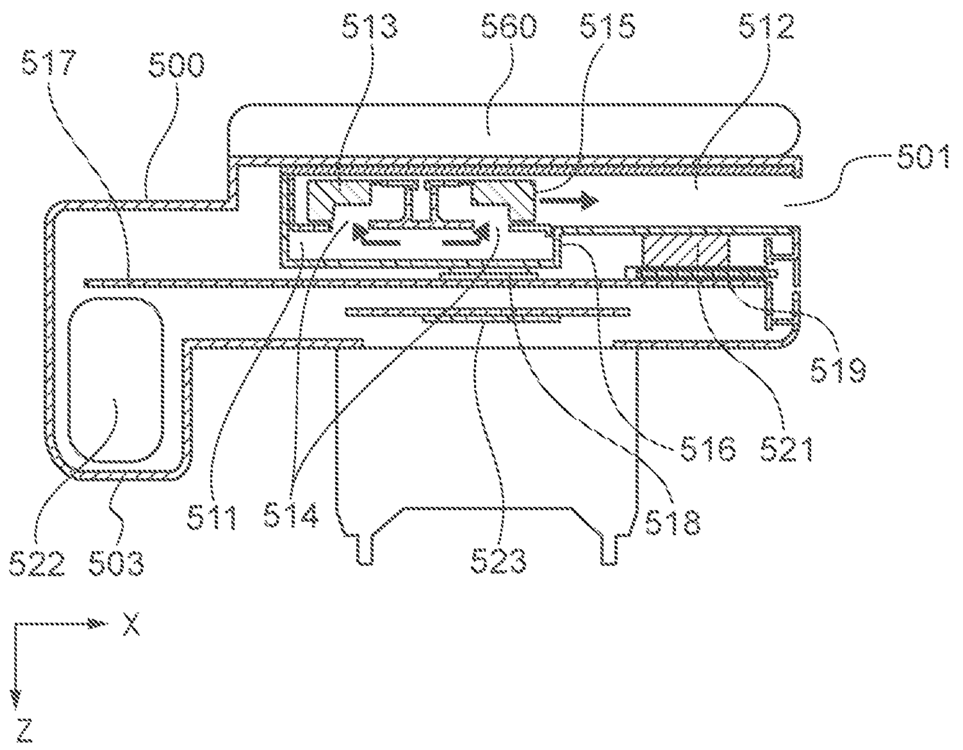
FIGS. 19A and 19B are a schematic horizontal cross-sectional view and a schematic Z-Y cross-sectional view of the image pickup apparatus main body, respectively.
Figure 19B:
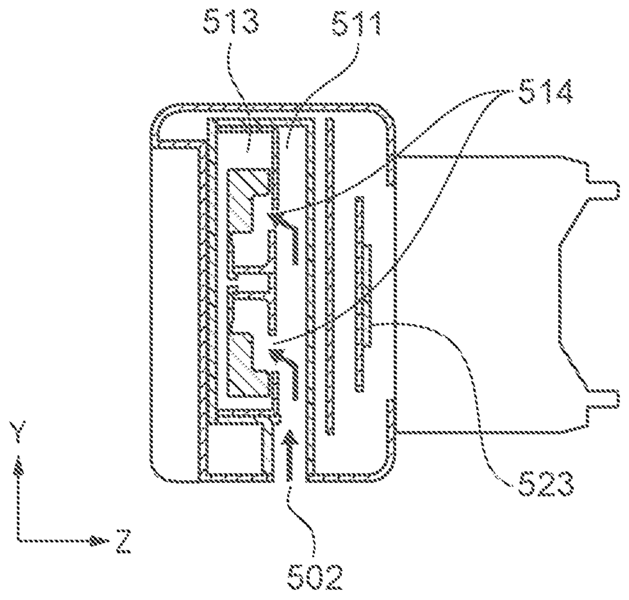
Figure 20A:
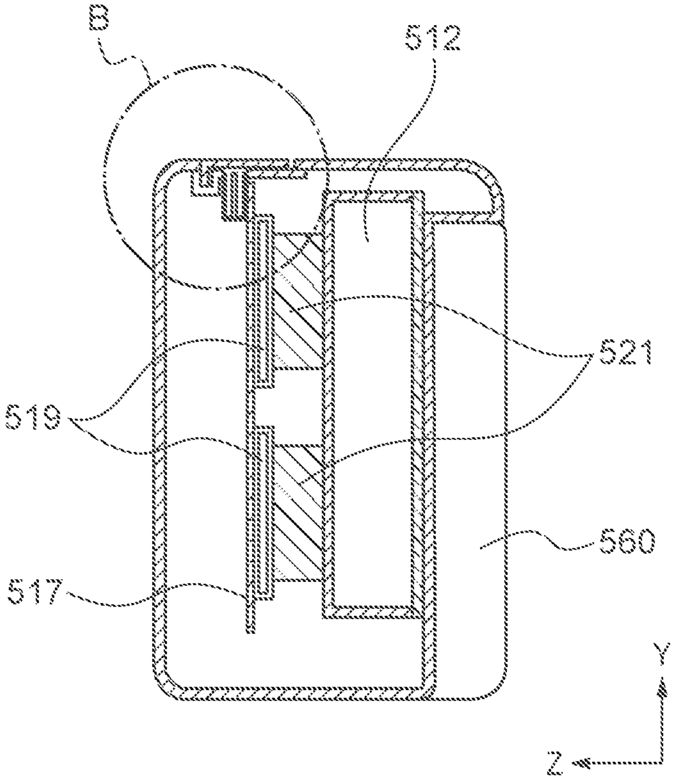
FIGS. 20A and 20B are a schematic Z-Y cross-sectional view of the image pickup apparatus main body and an enlarged view of a part B, respectively.
Figure 20B:
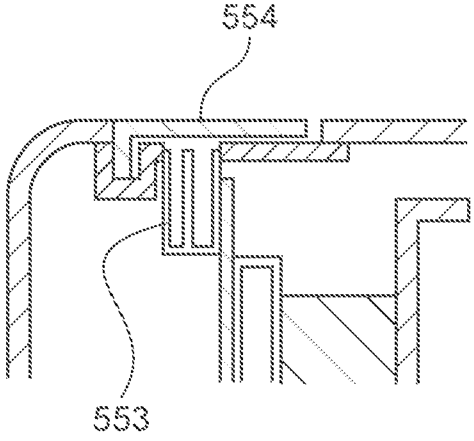
Figure 21:
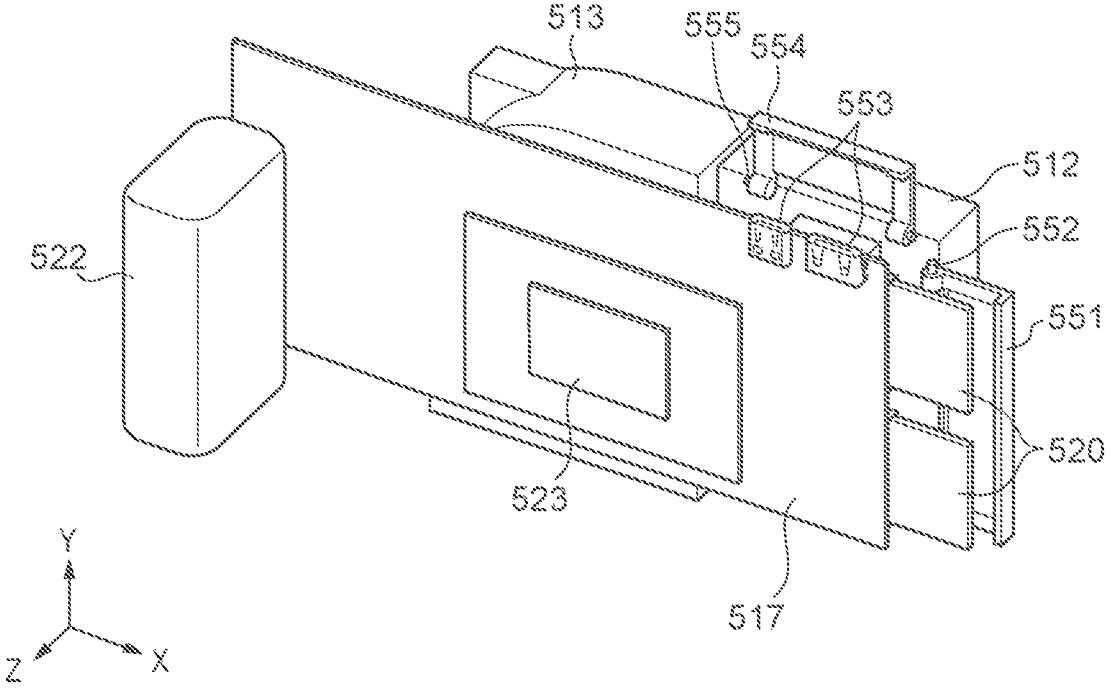
FIG. 21 is a front perspective view of the internal configuration of the image pickup apparatus main body.

FIG. 19A is a schematic horizontal cross-sectional view of the image pickup apparatus main body 500, and FIG. 19B is a schematic Z-Y cross-sectional view of the image pickup apparatus main body 500. FIG. 20A is a schematic Z-Y cross-sectional view of the image pickup apparatus main body 500, and is a cross-sectional view passing through the connection terminal 553. FIG. 20B is an enlarged view of the part B in FIG. 20A. FIG. 21 is a front perspective view of the internal configuration of the image pickup apparatus main body 500. In FIGS. 19A to 21, illustration of components other than the main components is omitted.

Figure 22A:
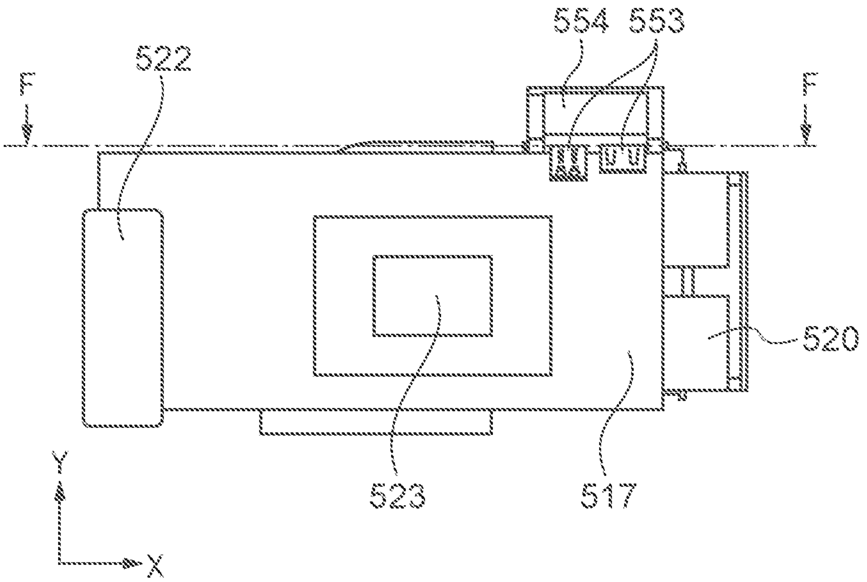
FIGS. 22A to 22C are a front view of the internal configuration of the image pickup apparatus main body, a cross-sectional view taken along line F-F, and an enlarged view of a part C, respectively.
Figure 22B:
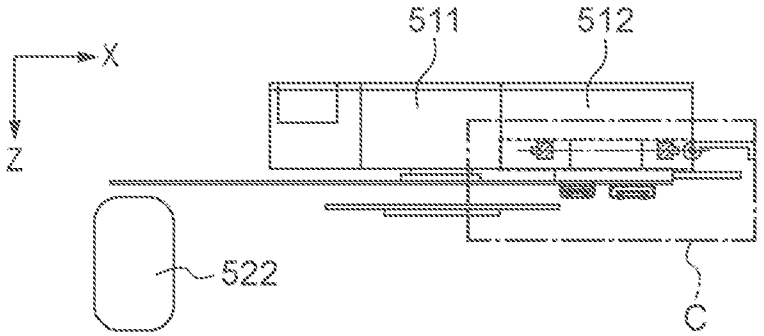
Figure 22C:
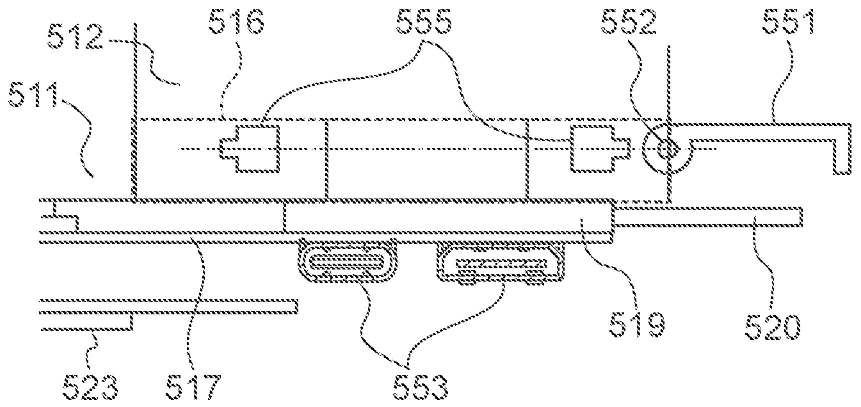

FIG. 22A is a front view of the internal configuration of the image pickup apparatus main body 500. FIG. 22B is a cross-sectional view taken along line F-F in FIG. 22A. FIG. 22C is an enlarged view of the part C in FIG. 22B.

Main components inside the image pickup apparatus will be described with reference to FIGS. 19A to 22C. The heat dissipation duct according to the present embodiment includes a first duct 511, a second duct 512, and a cooling fan 513 (FIG. 19A).

As shown in FIG. 21, the control circuit board 517 is disposed on the +Z side to the heat dissipation duct. The image pickup device 523 is mounted on the +Z side surface of the control circuit board 517. The element 518 (FIG. 19A) is mounted on the −Z side surface of the control circuit board 517. The heat of the element 518 is transferred to the first duct 511.

As shown in FIG. 19A, the media slot 519 is mounted on a surface (−Z side surface) of the control circuit board 517 facing the second duct 512. In the present embodiment, two media slots 519 are mounted side by side in the Y direction (FIG. 20A). A heat-conductive rubber 521 which contacts the media slot 519 and the second duct 512, is disposed between the media slot 519 and the second duct 512 in the Z direction. The heat of the recording medium 520 is transferred to the second duct 512 via the media slots 519 and the heat-conductive rubbers 521. The battery 522 is disposed in the grip part 503.

A connection terminal(s) 553 having an insertion part facing upward (in the +Y direction) is mounted on a part (an edge portion) of the control circuit board 517 on the +X side and the +Y side (FIGS. 21, 22C). It should be noted that, although the connection terminal 553 is mounted on the control circuit board 517, the present invention is not limited thereto, and the connection terminal may be mounted on another circuit board arranged in parallel close to and in parallel with the control circuit board 517.

The connection terminal 553 is located on the side (+Z side) opposite to the side on which the media slots 519 are mounted, with respect to the control circuit board 517 in the optical axis direction (FIGS. 20A and 20B). That is, the media slots 519 and the connection terminal 553 are arranged on different surfaces (on opposite surfaces) of the control circuit board 517, and are close to each other when viewed from the Z direction. However, the insertion direction of the recording medium 520 into the media slots 519 is the X direction, whereas the insertion direction of the connection plug 564 into the connection terminal 553 is the Y direction; therefore, the insertion parts thereof are not close to each other in appearance.

As shown in FIGS. 19A and 19B, the first duct 511 forms a space located to the +Z side of the fan intake port 514 of the cooling fan 513, and is connected to the intake port 502 (FIGS. 17B and 19B). The second duct 512 forms a space extending in the +X direction from the fan exhaust port 515 of the cooling fan 513, and is connected to the exhaust port 501 (FIGS. 17A and 19A). The width of the flow path formed by the second duct 512 is equal to the width of the fan exhaust port 515 in the Z direction. Therefore, as a flow path of the heat dissipation duct in the image pickup apparatus main body 500, a forced air cooling flow path is formed in which the intake port 502, the first duct 511, the cooling fan 513, the second duct 512, and the exhaust port 501 are connected in this order.

Due to the image pickup operation of the image pickup apparatus 700, the element 518 on the control circuit board 517, the recording medium 520, and the like generate heat. At such time, the cooling fan 513 is operated, the air (outside air) is taken in from the intake port 502 (FIG. 19B), and the air warmed by the heat transferred to the first duct 511 and the second duct 512 is exhausted from the exhaust port 501 (FIG. 19A).

As shown in FIGS. 21 and 22C, the media cover 551 is rotatable about the media cover rotating shaft 552, and the terminal cover 554 is rotatable about the terminal cover rotating shaft 555.

As shown in FIG. 22C, the +Z-side end face of the second duct 512 is recessed to the −Z side with respect to the +Z-side end face of the first duct 511, and forms a step (FIGS. 19A and 22C). That is, the second duct 512 has a step part 516 recessed in the optical axis direction (−Z side) with respect to the first duct 511. The media cover 551 and the media cover rotating shaft 552, which is a rotation mechanism of the media cover 551, are arranged on the step part 516. Further, the terminal cover 554 and the terminal cover rotating shaft 555, which is a rotation mechanism of the terminal cover 554, are arranged on the step part 516. As a result, the space formed by the step part 516 can be used effectively, and thus an increase in the thickness of the image pickup apparatus main body 500 is suppressed.

The media cover 551 and the terminal cover 554, which are arranged on different surfaces of the image pickup apparatus main body 500, do not interfere with each other when being opened and closed. In addition, even in a state where the connection plug 564 is attached to the connection terminal 553, the connection plug 564 does not interfere when the recording medium 520 is inserted into and removed from the media slot 519.

In addition, in a case where an accessory device (not illustrated) is mounted on the upper surface of the image pickup apparatus main body 500 and the accessory device and the connection terminal 553 are connected to each other, the mounted state of the accessory device is easily visually recognized. Furthermore, when holding the image pickup apparatus main body 500, the user normally grips the grip part 503 and the end portion of the image pickup apparatus main body 500 on the side opposite to the grip part 503, and thus the connection plug 564 extending upward from the image pickup apparatus main body 500 does not interfere with the grip.

Figure 23A:
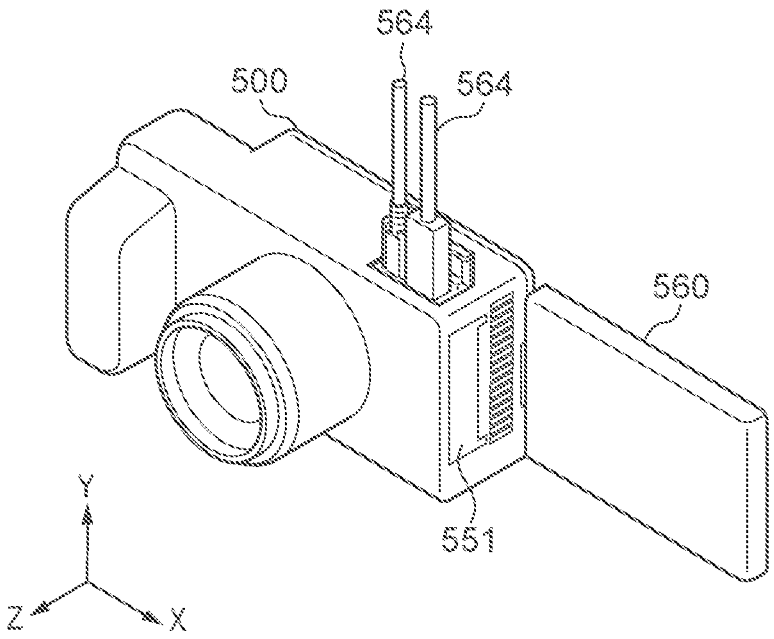
FIGS. 23A and 23B are front perspective views of the image pickup apparatus.
Figure 23B:
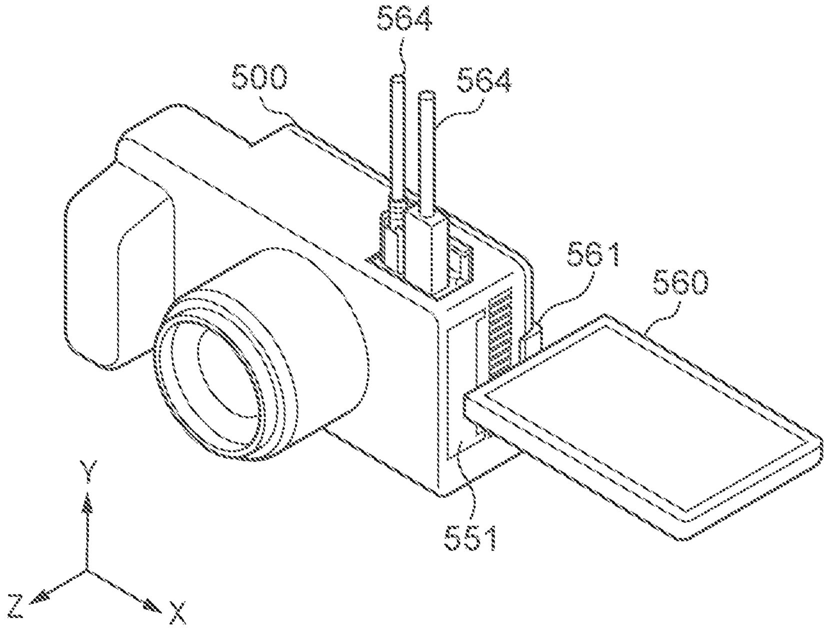

FIGS. 23A and 23B are front perspective views of the image pickup apparatus 700, and show the operation of the display part 560. FIG. 23A shows a state in which the display part 560 is rotated about the axis of rotation 562 (FIG. 17B) by 180° in the opening direction, with respect to the image pickup apparatus main body 500. FIG. 23B shows a state in which the display part 560 is rotated about the axis of rotation 563 (FIG. 17B) by 90° from the state shown in FIG. 23A.

When the display part 560 is rotated, the display part 560 is rotated within an area near the media cover 551. However, at the time of shooting, the operation of the image pickup apparatus main body 500 can be possible on condition that it is detected that the media cover 551 is closed, and therefore, normally, the display part 560 and the media cover 551 do not interfere each other at the time of shooting. Furthermore, the connection terminal 553 is disposed on the upper surface of the image pickup apparatus main body 500 (FIG. 18A), and therefore, the display part 560 and the connection plug 564 do not interfere with each other even in a case where the connection plug 564 is attached.

According to the present embodiment, the media slot 519 is mounted on the control circuit board 517 at a position not overlapping the grip part 503 as viewed in the optical axis direction. The heat dissipation duct (which includes the first duct 511, second duct 512, and cooling fan 513) is disposed at a position not overlapping the grip part 503 when viewed in the optical axis direction, and the second duct 512 is thermally connected to the media slot 519. Therefore, it is possible to achieve advantageous effects similar to those of the first embodiment regarding efficient cooling of the recording medium 520 while suppressing an increase in size.

In addition, the connection terminal 553 is disposed in a position overlapping neither of the exhaust port 501 nor the media insertion part 550 when viewed in the optical axis direction, which makes it possible to suppress an increase in dimension in the optical axis direction.

Further, the media cover 551, the media cover rotating shaft 552, the terminal cover 554, and the terminal cover rotating shaft 555 are disposed in the step part 516 which is formed by the second duct 512 being recessed in the optical axis direction relative to the first duct 511. As a result, the space formed by the step part 516 can be effectively used, and hence the expansion of the device dimensions can be suppressed.

Figure 24A:
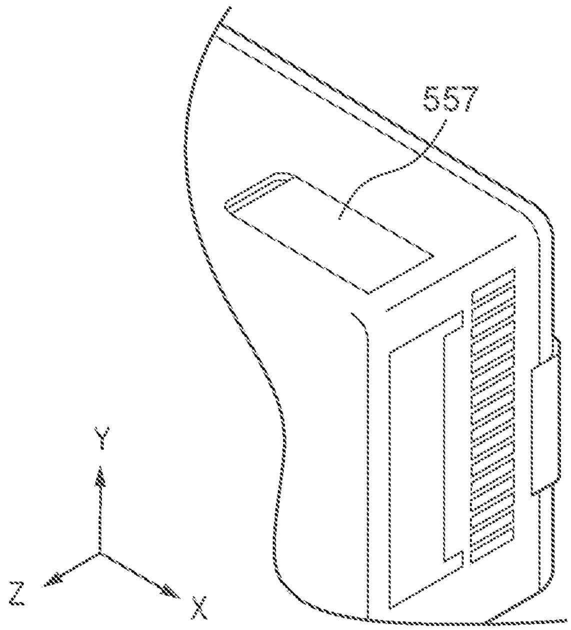
FIGS. 24A and 24B are a front perspective view and a rear perspective view of an upper-right end portion of the image pickup apparatus main body in a variation of the image pickup apparatus.
Figure 24B:
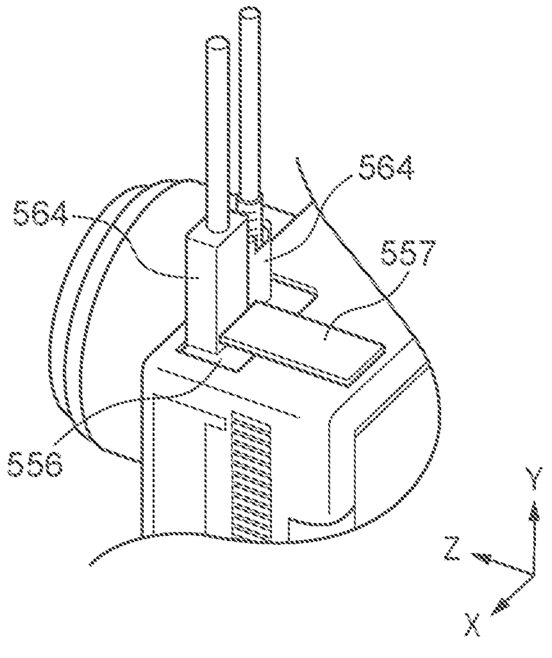

A variation of the present embodiment will be described with reference to FIGS. 24A and 24B. FIG. 24A is a front perspective view of an upper right end portion of an image pickup apparatus main body 500 in the variation. FIG. 24B is a rear perspective view of the upper right end portion of the image pickup apparatus main body 500 in the variation. In the variation, a terminal cover 557 is adopted instead of the terminal cover 554. FIG. 24A shows a closed state of the terminal cover 557. FIG. 24B shows an open state of the terminal cover 557, where the connection plug 564 is connected to the connection terminal 553.

The terminal cover 557 is prevented from coming off from the image pickup apparatus main body 500 by a flexible coupling part 556. By pulling out the terminal cover 557 from the image pickup apparatus main body 500 in the +Y direction and rotating the terminal cover 557 about the Y axis, the connection terminal 553 is exposed so that the connection plug 564 can be attached. Also in this configuration, the flexible coupling part 556 is disposed in the step part 516, which makes it possible to suppress an increase in the thickness of the image pickup apparatus main body 500 in the Z direction.

It should be noted that, in each embodiment, what is denoted by "substantially" is not intended to exclude completeness. For example, "substantially the entire region", "substantially on a projection-part", "substantially parallel", and "substantially perpendicular" include "entire region", "on a projection-part", "parallel", and "perpendicular", respectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-046754, filed Mar. 23, 2023, which is hereby incorporated by reference wherein in its entirety.

What is claimed is:

1. An image pickup apparatus comprising:

an apparatus main body;

a grip part integrally disposed on a front left side of a front surface of the apparatus main body, as viewed from a subject side, so as to protrude toward the subject side beyond the front surface of the apparatus main body;

a control board provided to the image pickup apparatus main body and arranged substantially perpendicular to an optical axis direction;

a storage part that is mounted on the control board, and that is capable of storing a recording medium;

a heat dissipation duct thermally connected to the storage part; and a cooling fan configured to perform air intake and exhaust for the heat dissipation duct, wherein the storage part, the heat dissipation duct, and the cooling fan are each disposed in a position not overlapping the grip part as viewed in the optical axis direction, and wherein the heat dissipation duct and the cooling fan are located on a back side of the apparatus main body relative to the control board and the storage part.

2. The image pickup apparatus according to claim 1, wherein the heat dissipation duct includes a first duct connected to an intake side of the cooling fan, and a second duct connected to an exhaust side of the cooling fan, the storage part and the second duct are thermally connected to each other, and a heat source other than the storage part mounted on the control board and the first duct are thermally connected to each other.

3. The image pickup apparatus according to claim 2, wherein when viewed in the optical axis direction, the storage part does not overlap the first duct and overlaps a part of the second duct, and when viewed in a left-right direction of the apparatus main body, the storage part does not overlap the second duct and overlaps a part of the first duct.

4. The image pickup apparatus according to claim 2, wherein a flow path cross-sectional surface area of the second duct is larger than a flow path cross-sectional surface area of the first duct.

5. The image pickup apparatus according to claim 1, wherein the storage part is disposed at a right end portion of the apparatus main body as viewed from the subject side.

6. The image pickup apparatus according to claim 1, wherein an intake port and an exhaust port are provided to different surfaces of the apparatus main body, and an insertion port for inserting the recording medium into the storage part is provided on the same surface as a surface of the apparatus main body on which the exhaust port is disposed.

7. The image pickup apparatus according to claim 2, further comprising a third duct disposed on a side opposite to the side on which the storage part is mounted with respect to the control board in the optical axis direction, wherein the storage part and the third duct at least partially overlap each other as viewed in the optical axis direction, and the control board and the third duct are thermally connected to each other within an area in which the storage part and the third duct overlap each other as viewed in the optical axis direction.

8. The image pickup apparatus according to claim 7, further comprising an image pickup device disposed substantially parallel to the control board, wherein the third duct is located between the control board and the image pickup device in the optical axis direction.

9. The image pickup apparatus according to claim 8, wherein the image pickup device and the third duct are thermally connected to each other.

10. The image pickup apparatus according to claim 7, further comprising a connecting passage that merges air taken into the third duct into a flow path in the first duct.

11. The image pickup apparatus according to claim 7, wherein a connection terminal for connecting an external device is fixed to the third duct.

12. The image pickup apparatus according to claim 11, wherein the connection terminal is fixed to a portion of the third duct that does not form a flow path.

13. The image pickup apparatus according to claim 11, wherein a number of the connection terminal is two, wherein the two connection terminals are provided side by side, and an intake port through which air is taken into the third duct is disposed between the two connection terminals.

14. The image pickup apparatus according to claim 1, wherein the heat dissipation duct includes the cooling fan, and a first duct is connected to an intake side of the cooling fan, and a second duct is connected to an exhaust side of the cooling fan, the second duct comprises a frame part and a heat transfer part having higher flexibility than the frame part, and the heat transfer part is thermally connected to the storage part.

15. The image pickup apparatus according to claim 14, wherein the heat transfer part is formed in a sheet shape, and is disposed so as to close a frame opening formed in the frame part from inside of the frame part.

16. The image pickup apparatus according to claim 15, wherein the heat transfer part is fixed to an inner surface of the frame part by adhesion or bonding.

17. The image pickup apparatus according to claim 15, wherein a part of the storage part enters the frame opening in the optical axis direction.

18. The image pickup apparatus according to claim 14, wherein the storage part has a step part, on a side facing the second duct in the optical axis direction, and the heat transfer part covers the step part.

19. The image pickup apparatus according to claim 14, wherein the storage part has a storage part opening, on the side facing the second duct in the optical axis direction, and the heat transfer part covers the storage part opening.

20. The image pickup apparatus according to claim 19, wherein the storage part has arm parts cut and raised inward in the storage part opening, and the arm parts abut on the recording medium stored in the storage part.

21. The image pickup apparatus according to claim 1, wherein the heat dissipation duct includes the cooling fan, and a first duct is connected to an intake side of the cooling fan, and a second duct is connected to an exhaust side of the cooling fan, the storage part and the second duct are thermally connected to each other, the image pickup apparatus main body is provided with an exhaust port connected to the second duct, a media insertion part for inserting the recording medium into the storage part, and a connection terminal for connecting an external device, and the connection terminal is disposed at a position overlapping neither of the exhaust port nor the media insertion part as viewed in the optical axis direction.

22. The image pickup apparatus according to claim 21, wherein the grip part is disposed at one end portion of the image pickup apparatus main body in the left-right direction, and the exhaust port and the media insertion part are arranged at the other end portion of the image pickup apparatus main body in the left-right direction.

23. The image pickup apparatus according to claim 21, wherein the connection terminal is located on a side opposite to the side on which the storage part is mounted relative to the control board in the optical axis direction.

24. The image pickup apparatus according to claim 21, wherein the second duct has a step part recessed in the optical axis direction relative to the first duct, and the step part is provided with a cover that covers the media insertion part and a rotation mechanism of the cover.

25. The image pickup apparatus according to claim 21, wherein the second duct has a step part recessed in the optical axis direction relative to the first duct, and the step part is provided with a cover that covers the connection terminal and a rotation mechanism of the cover.

* * * * *